US012705546B2

(12) United States Patent
McCarthy et al.

(10) Patent No.: US 12,705,546 B2
(45) Date of Patent: Aug. 11, 2026

(54) GEOLOCATION-AIDED UNIQUE SIGNAL RECOGNITION

(71) Applicant: HawkEye 360, Inc., Herndon, VA (US)

(72) Inventors: Nick McCarthy, Herndon, VA (US); Darek Kawamoto, Herndon, VA (US); Michael Drob, Herndon, VA (US); Kaitlin Zimmerman, Herndon, VA (US); Eric Mason, Herndon, VA (US)

(73) Assignee: HawkEye 360, Inc., Herndon, VA (US)

( * ) Notice: Subject to any disclaimer, the term of this patent is extended or adjusted under 35 U.S.C. 154(b) by 304 days.

(21) Appl. No.: 18/610,656

(22) Filed: Mar. 20, 2024

(65) Prior Publication Data

US 2024/0320558 A1 Sep. 26, 2024

Related U.S. Application Data

(60) Provisional application No. 63/469,135, filed on May 26, 2023, provisional application No. 63/491,452, filed on Mar. 21, 2023.

(51) Int. Cl.
*H04W 64/00* (2009.01)
*G06N 20/00* (2019.01)
*H04B 17/391* (2015.01)

(52) U.S. Cl.
CPC ......... *G06N 20/00* (2019.01); *H04B 17/3913* (2015.01)

(58) Field of Classification Search
None
See application file for complete search history.

(56) References Cited

U.S. PATENT DOCUMENTS 8,229,499 B2 * 7/2012 Yoon .................... H04W 48/20 455/552.1
2021/0168033 A1 6/2021 Whitefield et al.
2021/0326642 A1 10/2021 Gillian et al.

OTHER PUBLICATIONS

International Search Report & Written Opinion dated Sep. 20, 2024, issued in International Application No. PCT/US 24/20727.

* cited by examiner

*Primary Examiner* — Suhail Khan
(74) *Attorney, Agent, or Firm* — Sughrue Mion, PLLC

(57) ABSTRACT

Systems and methods to implement the initialization and steady state operation of a system for geolocation-aided unique signal recognition (USR). The unique signal recognition (USR) technique uses geospatial location data (geolocation data), labeled datasets, expert curated datasets, and partially labeled "enhanced" datasets for training a machine-learning radio frequency signal recognition model (also referred to as "RF recognition model" (RFRM)) to recognize and locate certain RF signal emitters of interest. The unique signal recognition may utilize a variety of data clustering techniques that operate on batches of data, comprising a corpus of linked RF data and derived features.

21 Claims, 16 Drawing Sheets

Clustering in the South China Sea

Region: [1.124, 22.581] x [103.761, 120.308]
([Latitude Range] x [Longitude Range])
(South China Sea)

Time: [2022-09-01, 2023-02-09]

Number of Clusters: 221

GEOLOCATION-AIDED UNIQUE SIGNAL RECOGNITION

CROSS REFERENCE TO RELATED APPLICATION

The present application claims priority to U.S. Provisional Application No. 63/491,452 filed Mar. 21, 2023 and U.S. Provisional Application No. 63/469,135 filed May 26, 2023, the disclosure of which is incorporated herein in its entirety.

BACKGROUND

1. Field

The following disclosure relates generally to systems and methods for radio signal recognition, and more specifically, to the initialization and steady state operation of a system and method for geolocation-aided unique signal recognition.

2. Description of Related Art

Various electrical devices emit radio frequency (RF) signals (also referred to as radio signals). For example, communications radios, emergency safety beacons, radars, television broadcast towers, wireless access points, cellular towers, cellular phones, ship and vessel identifiers, and satellite phones, among other radio emitters, transmit radio signals that may be received by other devices. To determine a geospatial location (geolocation) of these signal emitters, localization techniques often rely on some form of multilateration based on a time or frequency difference of a signal detected at several receivers. Typically, a detector (receiver) and estimation techniques for timing and frequency are designed for a specific signal of interest.

In the related art, a collection of machine learning and statistical techniques such as generative networks (e.g., generative adversarial network (GAN) or a variable auto encoder (VAE)) are used to extract a feature embedding of RF data, and algorithms that compare the similarity of these features to other RF data, such as contrastive losses networks or clustering algorithms, are used to train a model for unique signal recognition. However, these techniques are resource intensive and historically require significant time investments to handcraft feature embeddings that do not readily scale across signals of interest. Thus there is a need for a more resource-efficient, scalable system and method of uniquely recognizing a signal.

Previous initiatives for initialization of a system and related method for unique signal recognition have been described in PCT Application PCT/US2023/014628 (GEOLOCATION AIDED UNIQUE SIGNAL RECOGNITION), filed on Mar. 6, 2023 and claiming priority from U.S. Provisional Application No. 63/316,926, filed Mar. 4, 2022, the entire content of which is incorporated herein by reference. According to the disclosure in this application, a geolocation may be generated, representing a location of an RF emission, for example, an X-band source on a vessel, in combination with various data that may be used to identify features of that transmission, such as a PDW (pulse descriptor word). Further initiatives for an analysis of radio frequency (RF) signals have been described in PCT Application PCT/US2023/015185 (TEMPORAL RECTIFICATION OF RF SIGNALS), filed on Mar. 14, 2023 and claiming priority from U.S. Provisional Application No. 63/320,006, filed Mar. 15, 2022, the entire content of which is incorporated herein by reference.

SUMMARY

The present disclosure provides for systems and methods to implement the initialization and steady state operation of a system for geolocation-aided unique signal recognition (USR). More specifically, a unique signal recognition (USR) technique is described that uses geospatial location data (geolocation data), labeled datasets, expert curated datasets, and partially labeled "enhanced" datasets for training a machine-learning radio frequency signal recognition model (also referred to as "RF recognition model" (RFRM)) to recognize and locate certain RF signal emitters of interest. Such "model" may be a trainable system comprising one or more deep learning models (among other components with trained weights and hyperparameters connected either directly or through analytic processes that may not need training). According to an embodiment, the unique signal recognition technique may utilize a variety of data clustering techniques that operate on batches of data, rather than pairs or triples. Application of these clustering techniques over a corpus of linked RF data and derived features, is unique. Using only the supervised data, the mean average precision (mAP) can be improved from state-of-the-art approach that uses autoencoders by ~5%. Also, because these techniques do not require a projection like, for example, PCA (principal component analysis) and t-SNE (t-distributed stochastic neighbor embedding) to compare two geolocations, it is has the potential to be computationally much less expensive and speed up inference by 95% or more.

By applying the clustering techniques to measure similarities within linked batches of RF data and derived features, significant improvements to the performance of the resulting trained model may be realized.

To implement the USR process, a signal analysis engine, which uses one or more processing techniques, such as geolocation processing, RF machine-learning (RFML), and/or digital signal processing (DSP), may be employed to process training datasets and ultimately train itself to identify the identity and location of a source of RF emissions rapidly and reliably. The signal analysis engine may use a unique pre-processing approach including different combinations of geolocation, deinterleaving, and assignation techniques, such as combining geolocations with an additional data source like the Automated Information System (AIS) which provides unique vessel identifiers like IMO, to derive a training dataset. Alternatively, training datasets may be derived from expert labelers or through the comparison and validation of geolocations with imagery data sources.

To derive an initial training dataset, the signal analysis engine may first operate in a mode that may not use the RFRM. The signal analysis engine uses at least the initial training dataset to ultimately generate and train one or more RFRM models. The RFRM model is optimized to perform rapid and accurate signal recognition of emitter-based RF energies, based in part on the iterative processing of successive training dataset(s) to yield more robust sets of labeled inputs. This iterative processing combines all (or some) of the techniques employed at the signal analysis engine with increasing reliance on the RFRM as the labeled datasets become more robust. One or more RFRMs may be employed, with different characteristics, for each iteration.

In an initialization system and process, the signal analysis engine may be configured to continuously re-train on an ever-increasing training dataset. To start, there is an initial training dataset that has been curated through an automated or semi-automated process. As additional geolocation data becomes available through subsequent satellite passes or through other sensors, this new data will be curated and added to the initial training dataset to create new enhanced datasets that will include a growing number of datapoints for model training. The RFRM may be retrained using these enhanced datasets iteratively as the training data grows. Eventually the RFRM will converge to become fully trained and may be used for steady state identification of unique emitters, such as vessels emitter radar or radio signals, based on geolocation-aided unique signal recognition.

According to an embodiment of the present disclosure, in an initialization system and process, as well as steady state systems and processes, various machine-learning techniques are employed by the signal analysis engine. These techniques may include supervised learning, unsupervised learning, and semi-supervised learning techniques to derive a training dataset and generate a RFRM at each of the one or more training iterations. Supervised learning is a machine-learning technique that uses labeled datasets designed to train or "supervise" a model into classifying data or predicting an outcome. For example, the signal analysis engine may use supervised learning to train a RFRM based on an initial or enhanced labeled dataset. Unsupervised learning is a technique that uses machine-learning algorithms to analyze and cluster unlabeled datasets without the need for human intervention. For example, the signal analysis engine may use unsupervised learning to determine groupings of RF energy from a collection of RF signals. Semi-supervised learning is a machine-learning technique that uses a training dataset with both labeled and unlabeled data. For example, the signal analysis engine may combine a labeled training dataset derived in a previous iteration with a collection of unlabeled RF signals in a current iteration through preprocessing to create an aggregated dataset of RF signals.

According to an initialization embodiment of the invention, the one or more RFRMs generated in each iteration may be optimized to perform increasingly accurate signal recognition of emitter-based RF energies. The optimization of the RF recognition model is based on the iterative processing of training datasets to yield more robust sets of labeled inputs. This iterative processing may combine all (or some) of the processing techniques employed at the signal analysis engine with increasing reliance on the RFRM as the labeled datasets become more robust.

In an initialization embodiment, the disclosed system and method uses deinterleaving and/or geolocation-aided deinterleaving techniques to preprocess sets of RF signals for initial training of RFRMs. Each of these deinterleaving techniques allow for deriving robust labeled training datasets that are processed to generate and train a RFRM. The RFRM is trained to perform an identification of emitters based on the labeled inputs of the training datasets. Deinterleaving also is used in steady state and detection processes for maritime and terrestrial applications.

According to another initialization embodiment, the disclosed system and method may process the labeled training datasets to generate and train an ensemble of RFRMs at each iteration. For example, during an iteration, the signal analysis engine may generate a plurality of RFRMs from a training dataset. Each of these RFRMs may be differently optimized to perform accurate signal recognition of emitter-based RF energies. As another example, during an iteration, the signal analysis engine may derive a plurality of training datasets and train a machine-learned model for each training dataset to generate the ensemble of RFRMs. Yet another example, during an iteration, the signal analysis engine may generate an ensemble of RFRMs for each of a plurality of training datasets.

In an embodiment of initialization or steady state processing, the disclosed system may combine an RFRM (e.g., the RFRM or ensemble of RFRMs) with the deinterleaving and geolocation-aided deinterleaving techniques. The combination allows for improving the signal recognition, including the deinterleaving techniques, such that the system may yield more accurate emitter identifications and geolocations.

In an embodiment of initialization or steady state processing, the disclosed system may first identify or tag one or more high-priority emitters. In response to determining a set of high-priority emitters, the system may: i) access a list of high-priority emitters, ii) prioritize preprocessing operations with respect to one or more of the high-priority emitters, and iii) use an RFRM model to identify RF energies emitted by the high-priority emitters. The system may also prioritize certain data transfer operations and allocations of geolocation processing resources such that geolocations for the high-priority emitters are completed faster (e.g., much faster) than a non-priority based approach.

In an initialization embodiment, the disclosed system and method may process the labeled training datasets to generate a list of preferred geolocations, i.e., plural labeled training datasets for future comparisons with incoming collections of RF signals to ultimately identify and locate a unique emitter, such as a radar on a specific vessel or associated with a specific terrestrial radar system, without requiring additional data sources like AIS or imagery. The list of preferred geolocations is subject to filtering to provide greater accuracy and selectivity for use in steady state processing.

In an initialization embodiment, the disclosed system and method may process the content of the list of preferred emitters, i.e., plural labeled training datasets, by a RFRM, and then passes the result an to inference algorithm to determine if the content shares similarity with an emitter contained in the preferred emitter list. In parallel, the disclosed system and method may process the content of the list of preferred emitters, i.e., plural labeled training, and calculate unique geolocations within a collection and process that result by a RFRM. The output of the RFRM is passed through an inference model to calculate the similarity to members of the preferred emitter list, with a loss score representing how similar the output is. An indication of the loss is then fed back to the RFRM for training.

In a steady state operation according to an embodiment, where a trained RFRM is made available, new collections of RF signals are first processed according to the steps for the formation of geolocations with associated RF metadata, and then added to a list of preferred emitters using automated processing techniques for updating the list of preferred emitters. Each qualified geolocation will be given a unique list identity and placed into clusters of related geolocations that share similar features, such as location, machine learning derived feature embeddings, and/or features of the signal (frequency, PDW, etc.).

According to another embodiment, the output of the list of preferred emitters will be provided along a first processing path to associate geolocation clusters with specific emitters. The geolocation data will be run through a trained RFRM, the result will be aggregated by a clustering algorithm that evaluates some number of derived features based on the emitter being geolocated, and the geolocation will be grouped among additional geolocations that it shares the greatest similarity with. Along a parallel second path, the geolocation with additional RF metadata will be input directly into the RFRM and the result will be compared for similarity to other emitters within the collection, even if these emitters are not in the preferred emitter list. Following a threshold processing, a USR labeled geolocation may be identified.

According to an embodiment, training of the RFRM does not occur during steady state operation; however, after a period of time, such as 3 months, or after a content of the preferred list of emitters is increased significantly, e.g., doubled, the training process as provided for initial processing, may be implemented.

The details of one or more disclosed implementations are set forth in the accompanying drawings and the description below. Other features, aspects, and advantages will become apparent from the description, the drawings, and the claims.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
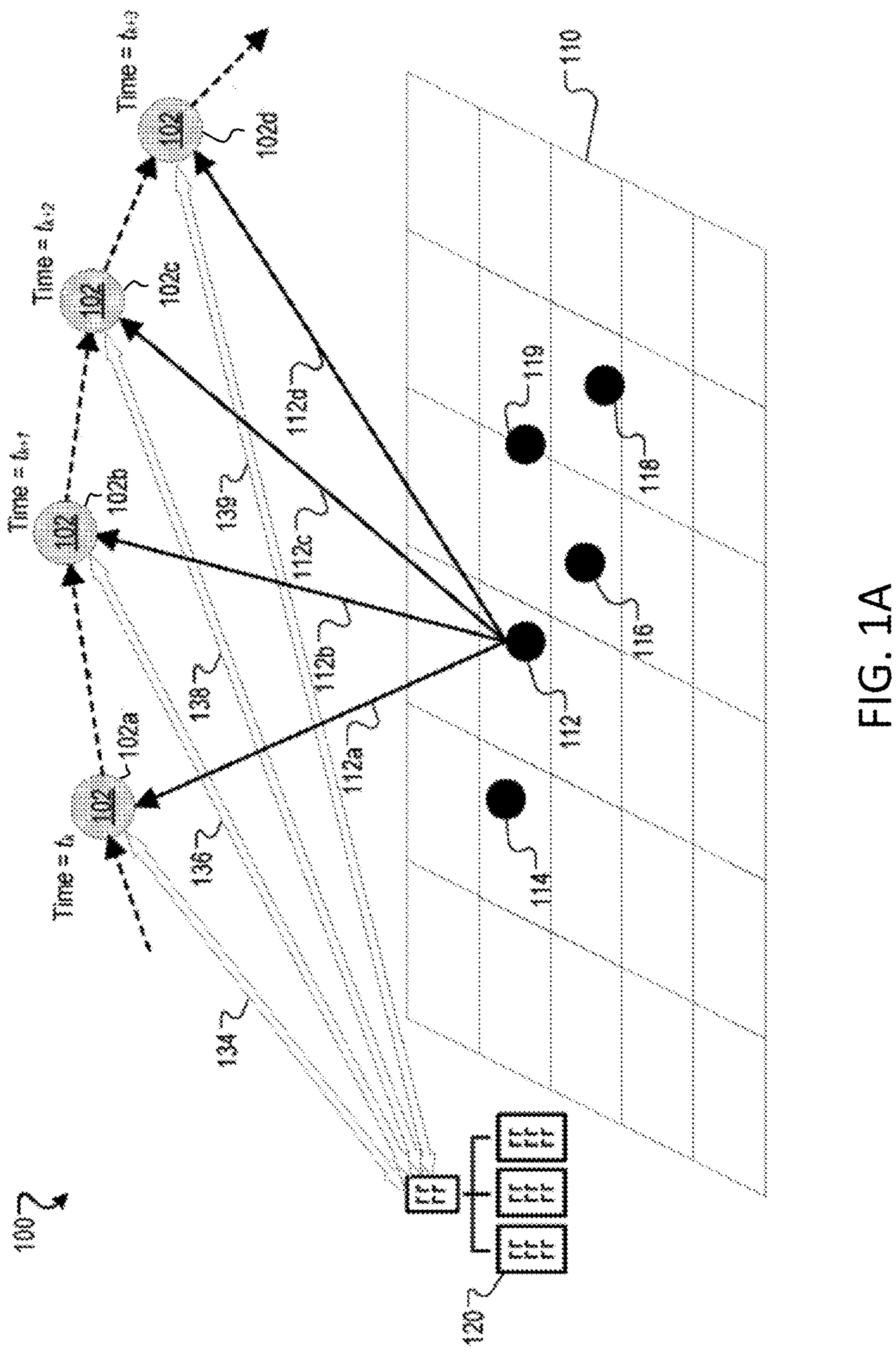
FIG. 1A illustrates an arrangement of an RF emission detector for implementing an initialization and steady state operation of a unique signal recognition system and method, according to an embodiment.

Hereinafter, embodiments of the present disclosure will be described in detail with reference to the accompanying drawings, where similar reference characters denote corresponding features consistently throughout.

Radio frequency (RF) signal geolocation (referred to simply as "geolocation"), may include operations to locate a radio frequency signal emitter (e.g., a source of RF energy emissions such as radar, radio or the like) based on analyzing RF signals emitted by the radio emitter. Geolocation is useful for radio spectrum access enforcement, commercial radio use analytics, and security applications where determination of the location of an emitter of radio signals is important. In some cases, locations of radio emitters are determined using one or more of time of arrival, frequency of arrival, time-difference of arrival, and frequency-difference of arrival, combined with reverse multilateration. These techniques may rely on knowing certain characteristics about the underlying signal (RF signal) being emitted, on correlating information collected by multiple sensing devices simultaneously, or by one or more sensing devices at multiple points in time. In other cases, locations of radio emitters are determined using specific signal analysis techniques and applications to localize various signals of interest. For example, a geographic information system (GIS) that employs such techniques is operable to connect people, locations, and data using interactive maps. These systems often leverage data-driven styles and intuitive analysis tools to enable data connections and support localization efforts for signals and emitter detection. In some cases, an example GIS implements methods of storing a user's workspace information and relevant application data as well as tracking actions taken to execute a given document or project. Other systems may be operable to display multiple types of geospatial data on a map.

Some geolocation systems include, or are integrated with, one or more Automated Information System (AIS) platforms that employ advanced filtering and search capabilities to view or track position and movement information for various nautical vessels across different geographic locations. For example, the conventional AIS platforms may generate an alert to indicate when an entity or emitter with ID: "123456789" is detected within "Boundary_Name_1." Some of these platforms may provide live as well as historical activity views of one or more vessels and may include an example watch list that allows for monitoring and accessing information about items of interest, such as a group of vessels A, B, and C. However, these platforms cannot track and identify vessels that have no AIS or similar signature, such as a dark ship or otherwise provide useful information about the identity or track of a vessel, based solely on the emitted RF characteristics.

In this context, an approach or framework for implementing unique signal recognition, particularly geolocation-aided unique signal recognition (GA-USR) is described. The framework may address problems or challenges with compiling, iteratively improving, and expanding truth-labeled datasets for USR applications that involve determining geospatial locations (geolocations) of identified emitters based on detected emitted RF energy. One such challenge is reducing latency with which the signal analysis engine may provide geolocations for high-priority emitters. A further challenge is to reliably re-identify emitters based on only RF emitter features. In solving these challenges, the signal analysis engine may use the RF recognition model to apply, for example, a priority technique to selectively perform preprocessing, data transfer, and geolocation processing for RF energy belonging to high-priority emitters. The engine may then deliver geolocation information for high-priority emitters much faster than by processing without the benefit of the priority technique, which allows for prioritizing based on the RF recognition model.

As noted above, an example signal analysis engine is operable to determine groupings of RF energy (e.g., radio signals) within a single wideband collection for one or more emitters that emit RF energy. Based on the disclosed framework, the signal analysis engine may fuse the RF groupings with a set of labeled geospatial data to generate a set of labeled inputs. The labeled inputs are iteratively processed to generate an RF recognition model that is optimized for accurate signal recognition of emitter-based RF energies. That processing also includes projecting data into a multi-dimensional decision space where algorithms can be applied to generate a multi-source ground truth dataset, as well as the use of complex filtering and clustering techniques as detailed subsequently.

FIG. 1A illustrates a computing system 100 for implementing geolocation-aided unique signal recognition, according to an embodiment. The system 100 includes a plurality of emitters in an area 110 at one or more candidate emitter locations 112, 114, 116, 118 and 119, a sensing device 102 configured to detect/receive RF energy/signals emitted by the plurality of emitters, and a receiver station 120. The sensing device 102 and/or the receiver station 120 may include a signal analysis engine (e.g., signal analysis engine 205 in FIG. 2).

In an embodiment, the sensing device 102 may be a mobile apparatus, such as spacecraft, aerial vehicles, terrestrial vehicles, or other suitable mobile platforms capable of movement along a predefined trajectory. For example, the sensing device 102 may be a satellite in orbit, an aerial vehicle such as an airplane or unmanned aerial vehicle (UAV) (e.g., drone, balloon), a car or truck, or a boat or submersible. As another example, the sensing device 102 may be installed on a satellite, aerial vehicle, terrestrial vehicle, or nautical vehicle. Sensing device 102 may include hardware, software and processing logic to detect and record radio signals emitted by signal emitters in the area 110. For example, the sensing device 102 may include a radio signal receiver. A distance between the sensing device 102 and the emitters in area 110 may vary due to movement of the mobile platform that includes the sensing device 102.

The sensing device 102 may include one or more radio frequency signal receivers (RF sensors) configured to detect and receive RF signals. For example, the RF sensors may comprise RF antennas coupled to transponders and/or network interfaces on board the sensing device 102. The sensing device 102 may include other hardware components, such as a digitizer (e.g., an analog to digital converter, or ADC) that converts analog RF signals received by the sensing device 102 to a digital format, one or more processors, and a memory that stores information corresponding to operations performed by the sensing device 102 (e.g., instructions to perform the operations of the sensor device 102, RF signal data corresponding to RF signals received by the sensor device 102, training data comprising one or more training datasets of labeled and/or unlabeled data for training a machine-learning RF signal recognition model, one or more trained machine-learning RF signal recognition models, etc.).

In an embodiment, the system 100 may include a plurality of sensing devices configured to receive RF signals emitted by the plurality of emitters, and each of the plurality of sensing devices may include a signal analysis engine. For example, the system 100 may include two, three, or any other suitable number of sensing devices. In such implementations, different pairwise emissions may be compared between versions of delays and sensor instances for computing distance metrics and evaluating candidate locations. For example, the system 100 may pairwise compare delays with respect to one emitter, the same delay with respect to multiple emitters, or differing delays with respect to multiple emitters. System 100 may be configured such that all or multiple pairwise copies may be evaluated using the techniques described herein for assessing data describing distances, candidate locations, or combinations of each.

In an embodiment, the area 110 is a geographic region on the Earth's surface. For example, the area 110 may comprise a two-dimensional (2D) plane parallel to the Earth's surface at sea level or at a fixed elevation (e.g., a few feet to a few tens or hundreds of feet above sea level). As another example, the area 110 may comprise a three-dimensional (3D) region of space that is proximate to the Earth's surface at multiple elevations above and/or below sea level (e.g., a continuous or discreet range of elevations). The plurality of emitters in area 110 may include one or more of emergency safety beacons, radar systems, ships or maritime vessels, television broadcast towers, wireless access points, wireless transmitters, cellular towers, cellular phones, satellite phones, or other radio emitters. For example, the candidate locations 112, 114, 116, 118, and 119 may correspond to a same type of emitter or to one or more different types of emitters. Each of the plurality of emitters may include hardware, such as one or more communications radios, that transmit radio signals (emit RF energy) that may be received by another device, such as the sensing device 102.

The sensing device 102 may be a mobile or stationary device. For example, the system 100 may include one or more sensing devices 102 that are mobile, one or more sensing devices 102 that are stationary, or a combination of sensing devices 102 that are mobile and sensing devices 102 that are stationary. The sensing device 102 may include a sensor that measures a relative position of the sensor device with respect to the area 110. For example, the sensing device 102 may include a sensor that measures a movement of the sensing device 102 relative to the earth's surface. The sensing device 102 may include one or more onboard sensors, and the sensing device 102 may move along a known (or calculable) path, trajectory, or orbit. Referring to FIG. 1A, the system 100 includes the sensing device 102 moving along a known orbit. The sensing device 102 may include a sensor to detect RF energy emissions in area 110 during movement along its orbital path. The sensing device 102 may be configured to determine how its movement path affects the detection of the RF energy emissions (e.g., differences in time of arrival, or frequency at arrival).

The sensing device 102 may be configured to operate in a variety of environments (e.g., space, air, land, water). In an embodiment, the sensing device 102 may be configured to operate in an environment corresponding to a type of the sensing device 102. For example, the sensing device 102 may be an aerial platform that follows an orbital trajectory with respect to the Earth's surface. In another example, the sensing device 102 may be a terrestrial vehicle (e.g., car, truck, etc.) that follows a ground trajectory (e.g., along marked roads and/or unmarked roads). In yet another example, the sensing device 102 may be a nautical vessel (e.g., boat, ship, submarine, etc.) that follows a nautical trajectory over and/or underwater.

As shown in FIG. 1A, during movement of the sensing device 102 along its trajectory, the sensing device 102 may detect and receive RF signals originating from one or more emitters in area 110. For example, during a known time interval, the sensing device 102 may receive a plurality of RF signals 112*a*, 112*b*, 112*c*, and 112*d* that originate from candidate location 112 at times $t_k$, $t_{k+1}$, $t_{k+2}$, and $t_{k+3}$ when the sensing device 102 is at geospatial location 102*a*, 102*b*, 102*c*, and 102*d*, respectively. Specifically, at time to the sensing device 102 is at location 102*a* in transit to location 102*b*, and the sensing device 102 receives RF signal 112*a* from candidate location 112. Next, at time $t_{k+1}$ the sensing device 102 is at location 102*b* in transit to location 102*c*, and the sensing device 102 receives RF signal 112*b* from candidate location 112. Then, at time $t_{k+2}$ the sensing device 102 is at location 102*c* in transit to location 102*d*, and the sensing device 102 receives RF signal 112*c* from candidate location 112. And at time $t_{k+3}$ the sensing device 102 is at location 102*d* in transit to its next location, and the sensing device 102 receives RF signal 112*d* from candidate location 112. In this way, at each time $t_k$, $t_{k+1}$, $t_{k+2}$, and $t_{k+3}$ the sensing device 102 may detect and receive a plurality of RF signals originating from a plurality of the candidate locations 112, 114, 116, 118, and 119.

In an embodiment of FIG. 1A, the sensing device 102 may send the received RF signals 112*a*, 112*b*, 112*c*, and 112*d* to the receiver station 120, over a communications link 134 between the sensing device 102 and receiver station 120. The communication link may be established for exchanging data at one or more locations along its movement trajectory. For example, at time $t_k$, communication link 134 may be established between the sensing device 102 and the receiver station 120 to exchange information on the RF signal 112*a*; at time $t_{k+1}$, communication link 136 may be established to exchange information on the RF signal 112*b*; at time $t_{k+2}$, communication link 138 may be established to exchange information on the RF signal 112*c*; and at time $t_{k+3}$, communication link 139 may be established to exchange information on the RF signal 112*d*. In this way, the sensor device 102 may exchange information on a plurality of RF signals received at various times using a corresponding communication link. The communications link 134, 136, 138, or 139 between sensing device 102 and receiver station 120 may comprise, for example, direct radio or optical links. According to an embodiment in FIG. 1A, the communications link 134 may be established between the sensing device 102 and the receiver station 120 at location 102*a* and for a corresponding time=$t_k$, while a communications link 136 may be established between the sensing device 104 and the receiver station 120 at location 104*a* and for a corresponding time=$t_{k+7}$.

Figure 1B:
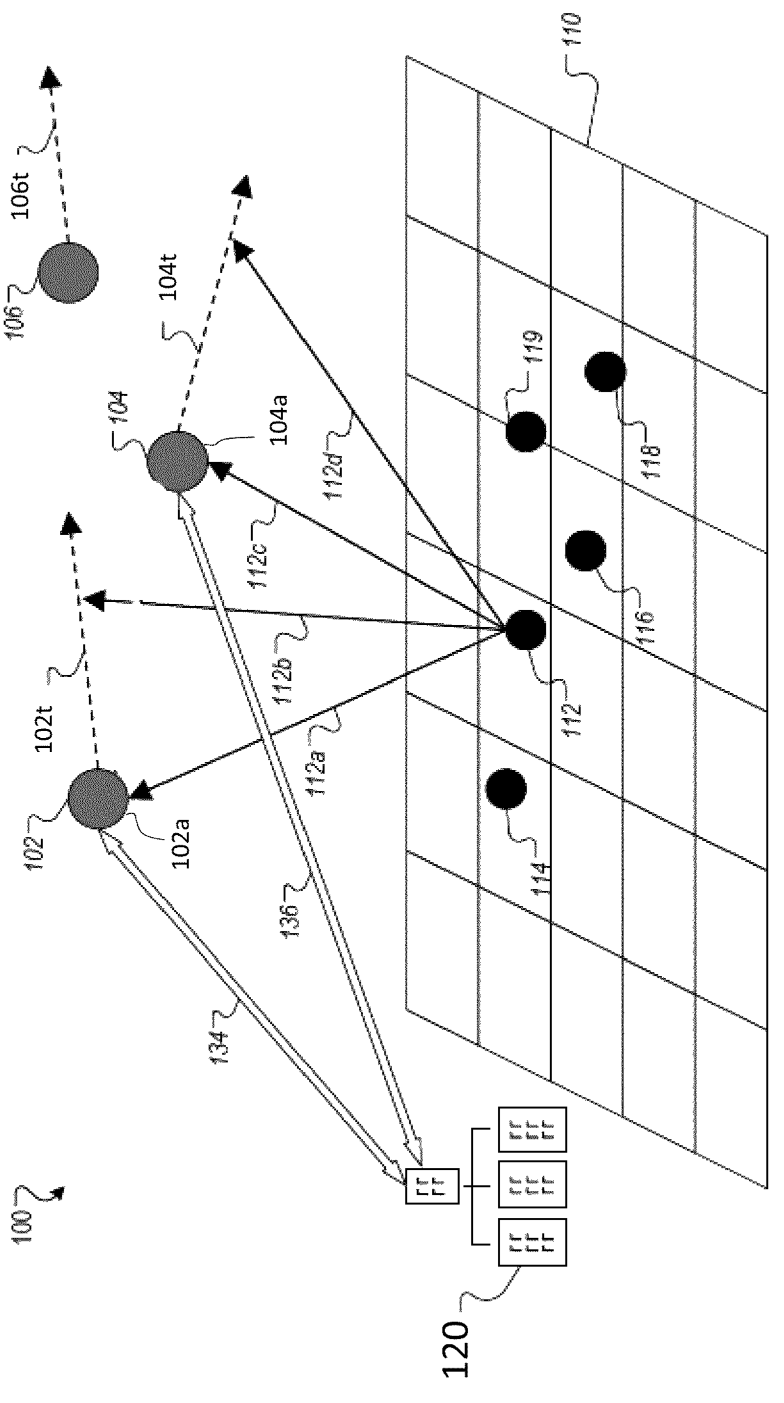
FIG. 1B illustrates an arrangement of multiple RF emission detectors for implementing an initialization and steady state operation of a unique signal recognition system and method, according to an embodiment.
Figure 1C:
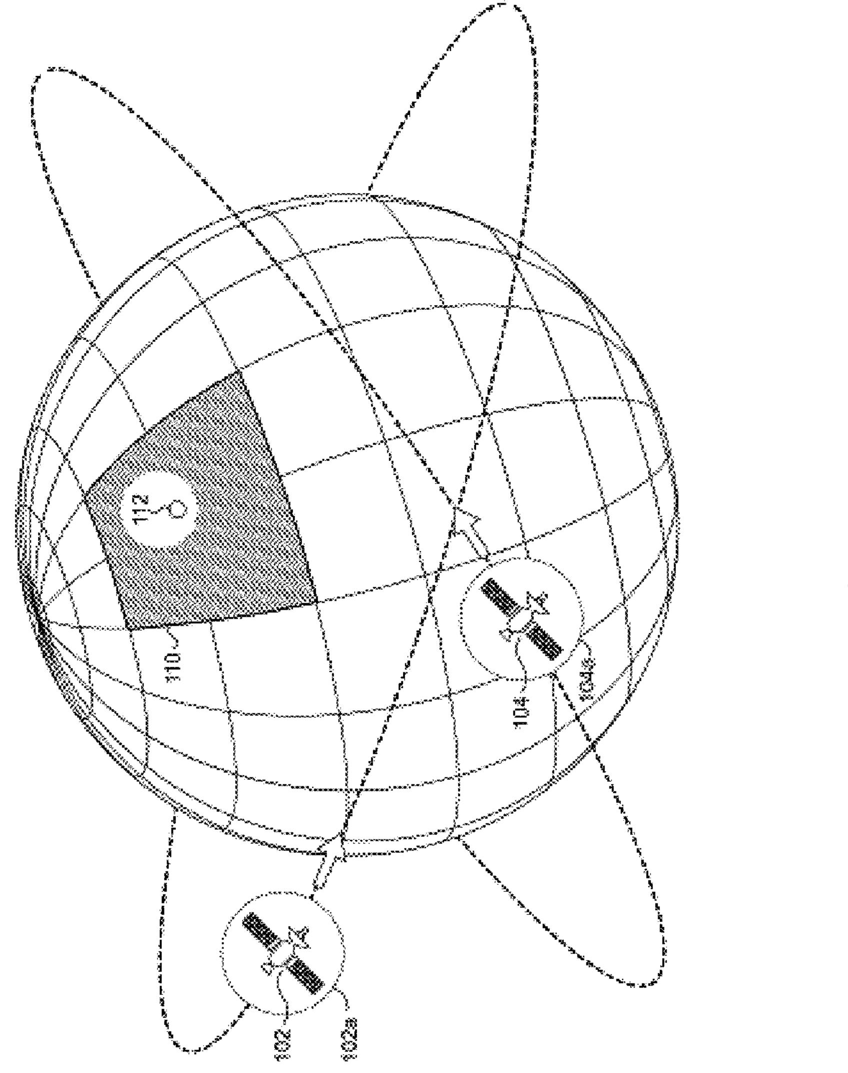
FIG. 1C illustrates an arrangement at a first timing of two satellite-based RF emission detectors for implementing an initialization and steady state operation of a unique signal recognition system and method, according to an embodiment.
Figure 1D:
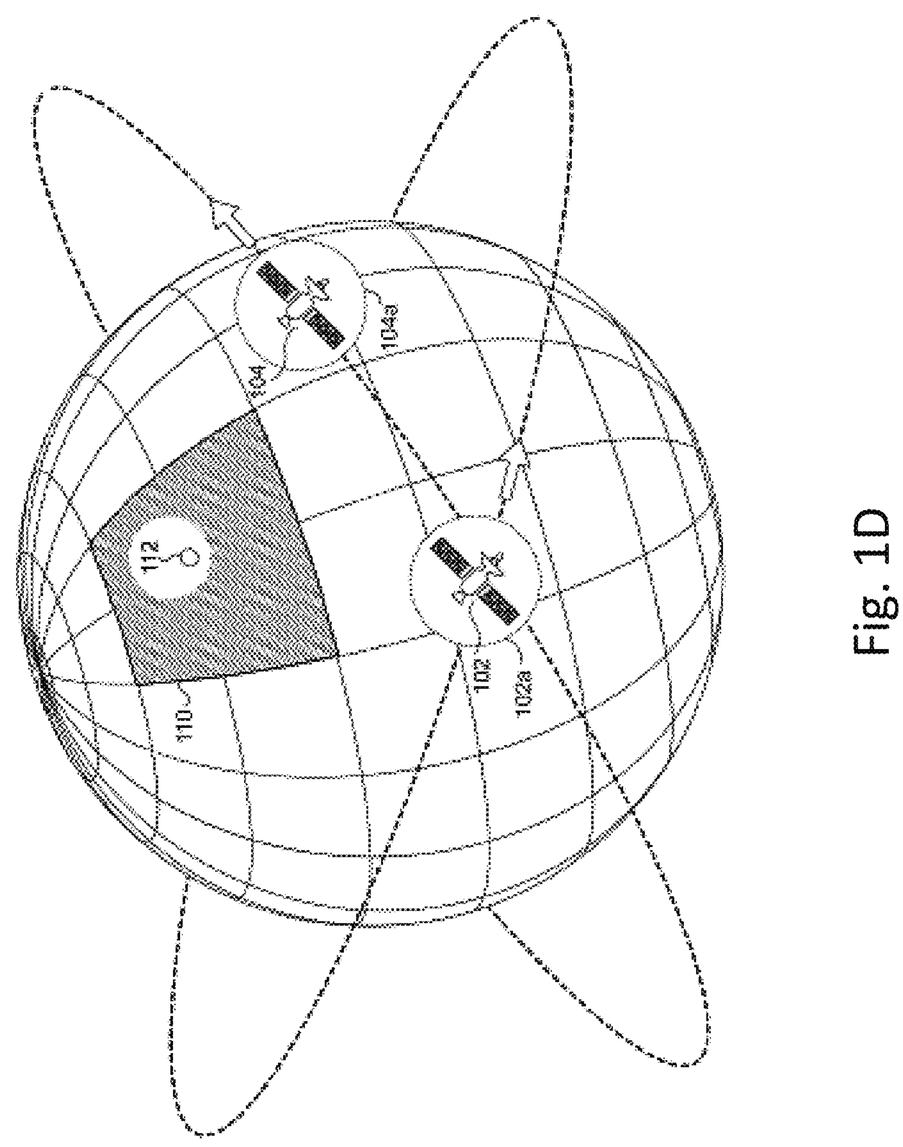
FIG. 1D illustrates an arrangement at a second later timing of two satellite-based RF emission detectors for implementing an initialization and steady state operation of a unique signal recognition system and method, according to an embodiment.

FIGS. 1B, 1C and 1D illustrate a conventional satellite system 100 of the type illustrated in FIG. 1A with multiple satellites that may be used for implementing geolocation-aided unique signal recognition, according to an embodiment involving a comparison of signals detected by a plurality of sensing devices.

FIG. 1B illustrates an embodiment having three sensing devices. For example, FIG. 1B illustrates sensing devices 102, 104, and 106, which are mobile, with sensing device 102 moving with a trajectory 102*t*, sensing device 104 moving with a trajectory 104*t*, and sensing device 106 moving with a trajectory 106*t*. Depending on the type of the sensing device, the movement of the sensing devices 102, 104 and 106 are in space in some implementations, or on the terrestrial surface in some other implementations. In implementations where one or more of the sensing devices are aerial platforms, the sensing devices follow trajectories through space. For example, the sensing devices can include satellites that follow orbital trajectories with respect to the Earth's surface.

According to an embodiment illustrated in FIGS. 1C and 1D, the system 100 may include sensing devices 102 and 104 on respective satellites in an orbit but separated apart. According to an embodiment, the respective satellites may be traveling in parallel orbits. However, the disclosure is not limited thereto. FIG. 1C illustrates that, at time tk, the sensing device 102 is at location 102*a* in transit to location 102*b*, and FIG. 1D illustrates that, at time tk+1, the sensing device 102 is at location 102*b* in transit to its next location. Similarly, FIG. 1C illustrates that, at time tk, the sensing device 104 is at location 104*a* in transit to location 104*b*, and FIG. 1D illustrates that, at time tk+1, the sensing device 104 is at location 104*b* in transit to its next location. In an example, at a first time each sensing device may detect first RF signals based on RF energy emitted from a candidate location. At second time each sensing device may detect second RF signals based on RF energy emitted from the candidate location. The system analysis engine may iteratively process, according to the methods disclosed herein, the two signals detected by the different satellites 102 and 104 at the same time, or may process the signals separated in time at the same satellite 102 or 104, and determine from such pairs of signals a candidate emitter.

Figure 1E:
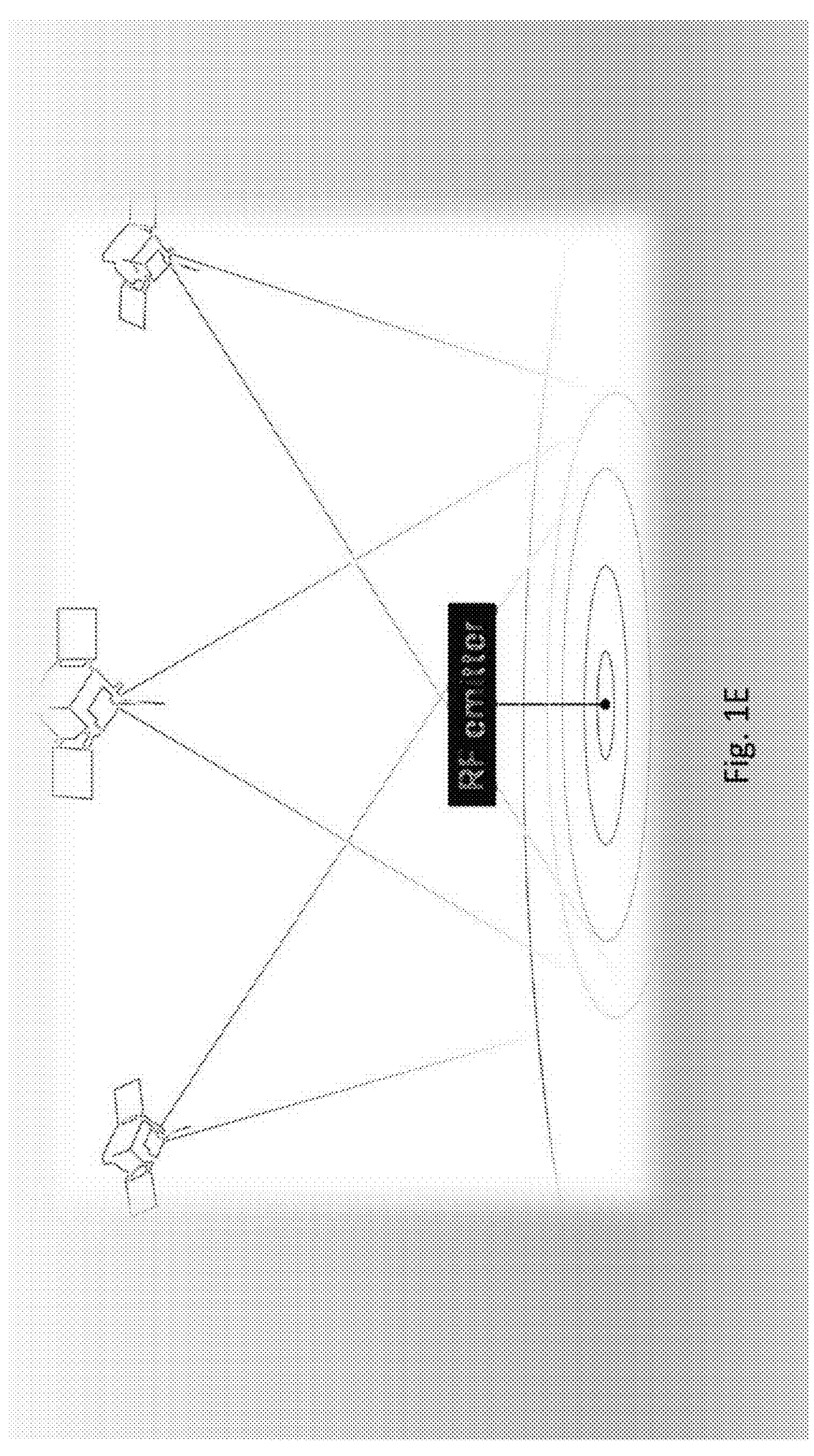
FIG. 1E illustrates an arrangement of three satellite-based RF emission detectors for implementing an initialization and steady state operation of a unique signal recognition system and method, according to an embodiment.

FIG. 1E illustrates an embodiment where three satellites in a common orbit will take a reading of the emissions from an RF emitter on the surface of the earth. In a typical constellation of satellites arranged to survey the surface of the earth, a plurality of satellites, which may be two, three or more, will take a reading or the RF from the emitter at the same time.

Figure 1F:
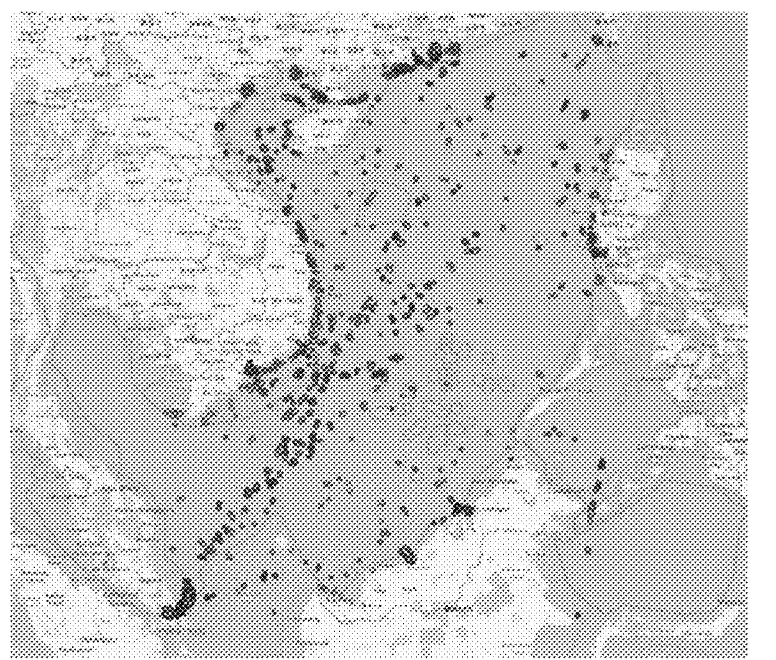
FIG. 1F illustrates a snapshot at a period of time of emitters, with colors representing clusters of emitters that share similarity based on the output of the unique signal recognition system, located in the South China Sea.

FIG. 1F illustrates a snapshot of multiple RF emitters in the South China Sea, at a single point in time, that are not labeled by AIS identifiers or otherwise. However, in an embodiment with a color display, emitters in this illustration with similar RF characteristics will be grouped together and share the same distinguishing color.

Figure 2:
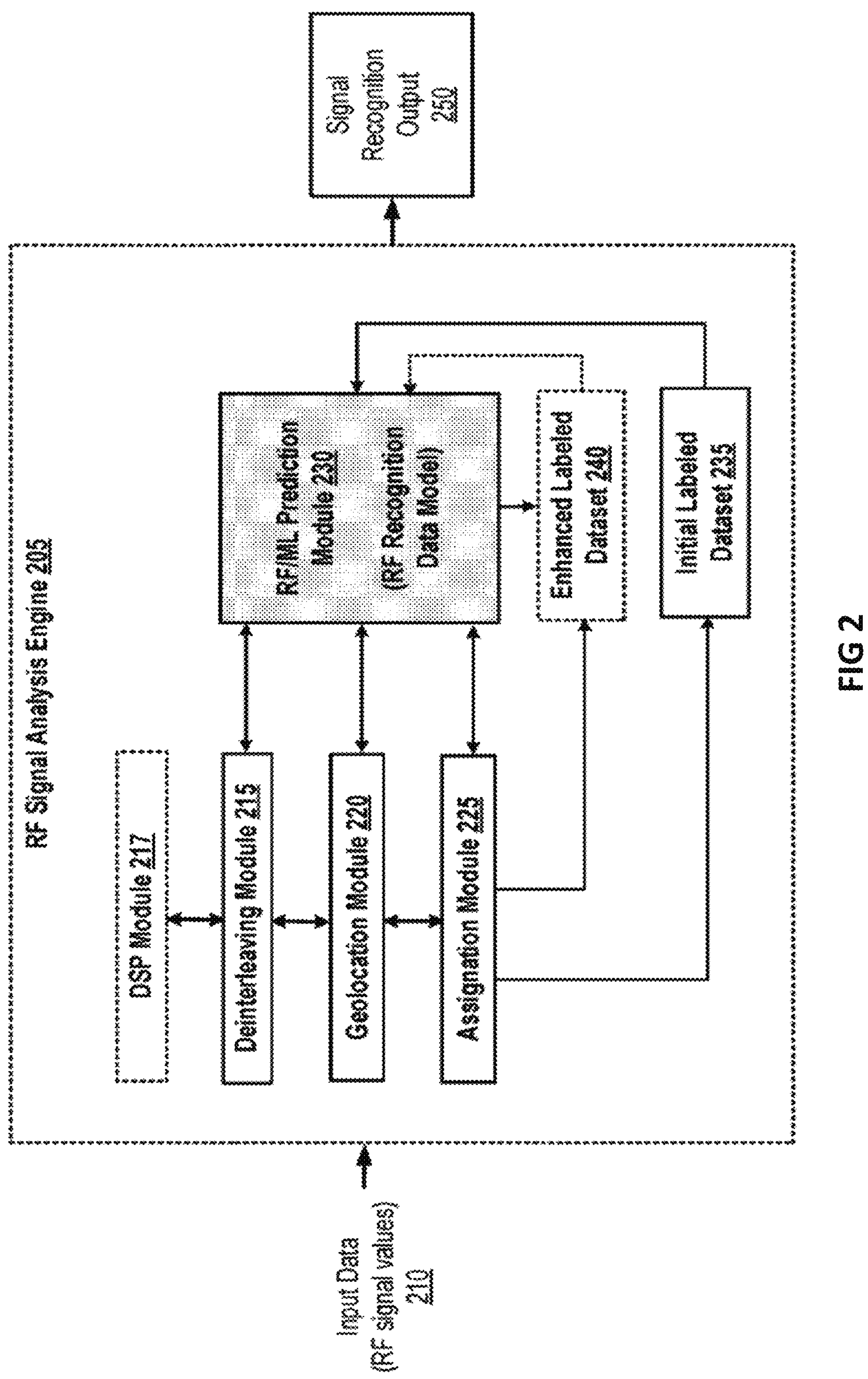
FIG. 2 illustrates a radio frequency (RF) signal analysis engine, according to an embodiment

FIG. 2 illustrates an example RF signal analysis engine 205 that is configured to process a set of input data 210 to generate a signal recognition output 250. The RF signal analysis engine 205 generally includes a digital signal processing (DSP) module 217, a deinterleaving module 215, a geolocation module 220, and an assignation module 225. These modules are coupled to an RF machine learning module (RFML) 230 that is trained to process input data 210 and provide a signal recognition output 250 that may be displayed or otherwise provided to a user or analyser for identifying and tracking RF emitters on vessels or the like.

Modules of the RF signal analysis engine 205 may be implemented in hardware, software, or both. In some implementations, the term "module" includes software applications/programs or a computer that executes one or more software programs (e.g., program code) that causes a processing unit(s) of the computer to execute one or more functions. The term "computer" is intended to include any data processing device, such as a desktop computer, a laptop computer, a mainframe computer, an electronic notebook device, a computing server, a smart handheld device, or other related device able to process data.

The deinterleaving module 215 may be configured to cooperate with the DSP module 217 of the RF signal analysis engine 205 to perform one or more deinterleaving operations on a set of RF signals that are input data 210. In an embodiment, the DSP module 217 may be configured to perform one or more digital signal processing (DSP) operations on the set of RF signals. The DSP operations may be applicable to collections of RF signals (e.g., sets of RF signals) from singular (or multiple) receivers and are independent from geospatial considerations. For example, the DSP operations may include calculating a center frequency, bandwidth, duration, or carrier-to-noise power density for an RF signal. In an embodiment, the DSP module 217 may be configured to calculate properties related to groups of RF signals such as intervals between identified periods of energy or similarity measures between elements within the group. In an embodiment, the DSP module 217 may be configured to perform mathematical clustering techniques, based on the calculated properties.

In an embodiment, the DSP module 217 may be configured to perform the various DSP operations with a precision that meets or exceeds a minimum precision. For example, the DSP module 217 may calculate a center frequency of an RF signal with a precision that meets or exceeds a minimum center frequency precision value. A minimum precision for each of the various DSP operations may be based on a predetermined threshold value for individual techniques or groups of techniques (e.g., a threshold value determined by a system operator and stored in a memory accessible by the DSP module 217, a threshold value determined prior to manufacture and integrated into a design or physical structure of the DSP module 217, etc.).

In an embodiment, one or more passgroup processing operations, which may be viewed as a pipeline, are directed to the formation of Geos. One part of the pipeline operation is a deinterleaving sub-process that includes segmentation. The deinterleaving module 215 may be configured to perform the segmentation in cooperation with the DSP module 217 to identify RF pulses and RF bursts in a set of multiple RF signals. An RF burst may comprise a plurality of RF pulses separated by a fixed or a variable time interval. Each RF pulse may correspond to an RF signal. For example, the sensing device 102 in FIG. 1A may receive a plurality of RF signals (e.g., the first set of RF signals) at different times, based on detecting a corresponding patterned RF energy emission. The sensing device 102 may provide the first set of RF signals to the deinterleaving module 215 to group the RF signals into a plurality of RF bursts based on an identified emitter. Each RF burst in a group may comprise a plurality of RF signals that have each been identified as an RF pulse belonging to the same RF burst. The primary output of deinterleaving is association (e.g., mapping to N).

In an embodiment, the pipelined passgroup processing operations may include a second sub-process called feature extraction, which produces features that may be used to decide whether bursts belong together based on the representation of those bursts in feature space. The deinterleaving module 215 may be configured to perform the feature extraction sub-process to generate a mapping from individual RF bursts to some finite dimensional space (e.g., $\mathbb{R}^n$ for some n) within a feature-extraction subprocess. For example, the deinterleaving module 215 may generate the mapping by combining an output of a finite collection of feature extractors $e_i: B \rightarrow \mathbb{R}^{m_i}$ where B is the set of all bursts.

In an embodiment, the RF signal analysis engine 205 may include one or more ensemble feature extractors. The ensemble feature extractors may include information relevant to the cyclic autocorrelation function (e.g., pulse repetition rate) and may also include statistical information relative to the outputs of single-burst feature extractors, et, taken across a set of grouped bursts $\hat{b}=\{b_1, \ldots, b_j\}$, $\hat{b} \in \hat{B}$. The deinterleaving module 215 may be configured to use the ensemble feature extractors to extract a set of ensemble features for each group. The outputs from the feature extractors and ensemble feature extractors may then be combined, such as by concatenating the results:

$$e: b \mapsto (e_1(b), \ldots, e_p(b), \hat{e}_{p+1}(\hat{b}), \ldots, \hat{e}_q(\hat{b}) \in \mathbb{R}^{m_1} \oplus, \ldots, \bigoplus \mathbb{R}^{m_q} \quad (2)$$

where, in equation/expression (1), $b \in \hat{b}$ and $$\sum_{i=1}^{q} m_i = n.$$

The system 100 may establish, assign, or otherwise denote e(b) as a feature vector for burst b. Based on the extracted feature sets, the deinterleaving module 215 may identify RF bursts that are from the same emitter. For example, given two bursts b, b' in non-time-adjacent subsets of the set of RF signals, an example deinterleaving algorithm is:

$$D: \mathbb{R}^n \times \mathbb{R}^n \rightarrow \{0,1\} \quad (3)$$

The preceding expression (2) may be used to compare feature vectors e(b), e(b') to render a binary decision as to whether they came from the same emitter. In one example implementation, D may comprise the Euclidean distance function followed by a threshold decision such that distances lower than the threshold result in a positive decision and distances greater (or equal to) the threshold result in a negative decision.

In an embodiment, as part of the passgroup pipeline processing, the deinterleaving module 215 may be configured to implement multiple algorithms with the ability to extract expert features that improve the performance of the RFML prediction module 230. These expert features aid to identify the RF pulses and RF bursts in the set of RF signals and are dependent the class of device(s) the RFML prediction module is tuned to detect. For example, the deinterleaving module 215 may obtain RF signals received at a sensing device (e.g., sensing device 102). The deinterleaving module 215 may identify a time-of-arrival (TOA) for each received RF signal, and calculate a time-difference-of-arrival (TDoA) between RF signals. Based on the estimated metadata produced by the expert feature processing pipeline, the calculated TOA, and the calculated TDoA, the deinterleaving module 215 may identify RF pulses in the set of RF signals that correspond to an RF burst emitted by a specific receiver. For example, the deinterleaving module 215 may identify a first RF burst comprising a first plurality of RF pulses, such that a TDoA between any two consecutive RF pulses from the first plurality of RF pulses is less than or equal to a threshold TDoA. In this way, the deinterleaving module 215 may identify one or more RF pulses and RF bursts. For example, the deinterleaving module 215 may identify a second RF burst comprising one of a second plurality of RF pulses received from the first emitter, and a second plurality of RF pulses received from a second emitter. The threshold TDoA may be based on the expert feature estimate(s). For example, the threshold TDoA may be calculated as a fraction or a percentage of the estimate (e.g., 20% of the estimated value).

In an embodiment, as part of the passgroup pipeline processing, the deinterleaving module 215 may perform an outlier removal process based on the TDoA, to help remove RF signals that are not due to consecutive pulses. The outlier removal process may be performed using various algorithms. For example, a heuristic based on an interquartile range (IQR) may be used with a criteria to only keep data within a range of +/−1.5*IQR. The output TDoAs generated from this step are the pre-processed expert feature data.

In an embodiment, as part of the passgroup pipeline processing, the deinterleaving module 215 may perform histogram processing to analyze the RF signal measurements and extract insights. By generating a histogram to represent features of the RF data as a distribution, the deinterleaving module 215 may identify a range of the distribution and any patterns in the distribution of feature values. For example, the deinterleaving module 215 may generate an initial histogram using 100 bins. Based on a typical range of expert features for a known specific radar mode, this results in sub-microsecond bins. Bins this size may be used to guarantee a binning resolution that will delineate different features in the case of multiple feature types that interleave pulses at discrete intervals. The deinterleaving module 215 may merge adjacent bins of the generated histogram to reduce the number of bins (e.g., to one or two bins for a feature that is known to be fixed, given a variance on the order of 100's of nanoseconds). This merged histogram is then passed to the next processes in the expert feature processing.

In an embodiment, as part of the expert feature processing, the deinterleaving module 215 may identify and group the RF signals into RF bursts based on one or more of a plurality of different discrete feature classification types, such as, for example, simple or periodic. For example, the deinterleaving module 215 may identify and group RF signals into RF bursts that are emitting in a fixed mode or a periodic mode. In this example, the deinterleaving module 215 may ignore (skip clustering) RF signals if the corresponding RF burst has a feature that does not conform to the known expert feature classes. In various embodiments, the feature classification type may be used as a catch-all term for features having a discrete set of intervals that RF pulses jump between in a pseud-random or deterministic way.

The deinterleaving module 215 may determine a feature classification type for a group of RF signals (e.g., an RF burst) using a two-step process. First, the deinterleaving module 215 may calculate a mean absolute deviation (MAD) of feature values within a sliding window that is moved across the received RF signals. For example, the deinterleaving module 215 may group a plurality of RF signals into a first RF burst comprising a first RF pulse, second RF pulse, third RF pulse, and fourth RF pulse. If the sliding window is size 2, then the deinterleaving module may calculated a MAD based on a first sample (between the first RF pulse and second RF pulse) and second sample (between the second RF pulse and third RF pulse), then based on the second sample and a third sample (between the third RF pulse and fourth RF pulse). In this way, the deinterleaving module 215 may obtain a collection of MAD values for different temporal states of RF pulses within an RF burst. The deinterleaving module 215 may determine a variance of the MAD values as a measure of a variation of the feature throughout the RF pulses within the RF burst. If the variance of the MAD values is small (e.g., less than or equal to a MAD variance threshold value), then the feature values do not deviate much over time. If the variance of the MAD values is large (e.g., greater than the MAD variance threshold value), then the feature values may deviate greatly. In the aforementioned example, the MAD variance threshold value may be set to "1", which assumes less than 1 microsecond of variation in feature. Based on the variance of the MAD, deinterleaving module 215 may perform a classification of the discrete feature value using expert knowledge and published information about the emitter characteristics.

In an embodiment, the deinterleaving module 215 may classify between two discrete feature types based on a number of bins used to generate the histograms when performing the histogram processing. The deinterleaving module 215 may use the bins as features and define a classification rule. For example, some emitters have a relatively small, fixed number of possible values. When the bins of the histograms are merged, an emitter with this type of feature will have discrete bins and will not reduce bin count, whereas an emitter that operates with many possible values and variations will have continuous support since it is generated by sampling uniform or Gaussian distributions. Therefore, merging the histograms should result in very few bins (e.g., 1 bin), and the first RF burst may be classified as a fixed type if the bin count of the merged histogram is below a lower threshold value (bin count lower threshold) for the bin count, and the second RF burst may be classified as a different feature type if the bin count of the unmerged histogram is above an upper threshold value (bin count upper threshold) for the bin count. In an embodiment, the bin count lower threshold may be set to "4", and the bin count upper threshold may be set to "40".

In an embodiment, the deinterleaving module 215 may generate a feature characterization with a suitable distance function for comparing features between multiple RF bursts. The deinterleaving module 215 may generate the feature characterization in parallel to performing feature type classification. The feature characterization may be a binary vector, in which each entry corresponds to a 1 microsecond bin, ranging from a minimum to a maximum value (e.g., 0-300 microseconds). The feature characterization may be constructed by binning (or quantizing) the histogram data into 1 microsecond intervals. Each element of the binary vector may be assigned a value of "1" if it corresponds to a non-empty bin of the histogram. In an embodiment, the binary vector may be compared using Jaccard distance since this representation is helpful for reducing signal-recognition false alarms.

In an embodiment, the deinterleaving module 215 is operable to perform one or more operations involving the set $\{e_i\}$. For example, the one or more operations may include taking such measurements as estimated bandwidth, center frequency, signal to noise ratio ($C/N_0$), burst rise and fall times, and chirp rate, as well as performing operations related to harmonic analysis and performing curve-fitting operations. Operations relating to harmonic analysis may include decompositions in generalized Fourier spaces projected onto subspaces of finite dimension, whereas operations relating to performing curve-fitting may include use of polynomial fitting functions with finite degree. Based on these processes and operations, the deinterleaving module

215 is operable to: i) group bursts together in time-adjacent subsets of the total RF collection and ii) apply ensemble feature extractors $\hat{e}_i:\hat{B}\rightarrow\mathbb{R}\,R^{m_i}$ where $\hat{B}$ is the set of grouped, time-adjacent pulses.

For example, radar pulses from a single emitter may commonly appear at regular close time intervals so that examining peaks in the cyclic autocorrelation function applied to short-duration subsets of the RF collection, and comparing against time of arrival and measured signal to noise ratio ($C/N_0$) for detected pulses in any subset, provides a means by which to establish pulse groupings. The cyclic autocorrelation function is related to, though not to be confused with, a cross-ambiguity function (CAF). In general, the autocorrelation function and the cyclic autocorrelation function are elements of signal processing and cyclostationary signal processing, respectively. Ambiguity and correlation both apply a quadratic functional to the data or signal of interest. Additionally, ambiguity and correlation both weight that quadratic functional by a complex exponential (sine wave) prior to integration or summation. The cyclic autocorrelation function is defined by an infinite-time average:

$$R_x(\tau, \alpha) = \lim_{T\rightarrow\infty}\frac{1}{T}\int_{-T/2}^{T/2} x(t+\tau/2)x^*(t-\tau/2)e^{-i2\pi\alpha i}\,dt \tag{1}$$

In an embodiment, for multiple RF signals that are detected across a set of emitters, the deinterleaving module 215 is operable to determine whether two or more RF bursts among the multiple RF signals should be grouped together, for example, as a cluster of signals. The RF signal analysis engine 205 may execute a deinterleaving operation to cluster the RF signals such that each cluster represents a possible grouping of RF bursts by emitter.

The geolocation module 220 communicates with the deinterleaving module 215 to, for example, apply one or more geolocation processes to obtain reliable geolocation information for individual RF bursts. For example, geolocation module 220 is used to integrate certain geolocation information with operations of the deinterleaving module 215 such that, for each of the one or more receivers of system 100, the integrated geolocation information may include geospatial measurements comprising a respective time-varying position measurement (e.g., latitude, longitude and time) and may include a respective velocity measurement for the receiver.

In some implementations, the RF signal analysis engine 205 uses the geolocation module 220 to determine mappings of the combined (or clustered) RF pulses to geolocations. For example, the clustering processes of the deinterleaving module 215 described above may generate clusters of RF pulses as a precursor operation to the geolocation mapping operation(s) performed by the geolocation module 220. The deinterleaving module 215 may pass outputs (e.g., deinterleaving outputs) of its clustering tasks to the geolocation module 220, which then provides those exemplary deinterleaving outputs as inputs to its one or more geolocation processes. As a result of correct deinterleaving, the geolocation processes may produce more precise geolocations since more total energy from each emitter is used as a foundation for calculating the resulting geolocations.

The assignation module 225 is configured to generate and apply one or more assignation labels based in part on results from the deinterleaving module 215, the geolocation module 220, or both. The assignation labels may indicate an assignment of RF signals from an emitter to a corresponding entity (e.g., vessel, corporation, nation-state, non-governmental organization, etc.). In some implementations, the assignation model relies on information from outside of the RF signal analysis engine 225 to provide time and identity labels for emitter positions. An example of such outside information is the AIS dataset, and another is a unique identifier provided by the system using an associations algorithm. For these implementations, temporal and spatial proximity between positions in the external data and geolocations produced by the geolocation module 220 allow for propagating the labels to the individual RF bursts. In some implementations, the RF signal analysis engine 225 creates an identifier for a cluster of bursts defined by the deinterleaving module 215 or for a geolocation produced by the geolocation module 220 and all of the bursts used to calculate that geolocation. In some embodiments, an association algorithm is combined with geospatial algorithms, which analyzes most recent known location of a given emitter to make assumptions as to likely positions of the given emitter at some point in time in the future.

The RF signal analysis engine 205 further includes an RFML prediction module 230 that receives an initial labeled dataset 235 and generates an enhanced labeled dataset 240 based on the received initial labeled dataset. For example, the RFML prediction module 230 may include an untrained data model and, based on machine-learning processes, is configured to train the data model to apply a particular computational approach for implementing unique signal recognition. The RFML prediction module 230 is configured to iteratively generate sets of labeled training data ("iterative sets of labeled training data") that each include RF signal inputs derived from the grouping of RF signals and a respective label for each RF signal input. In an embodiment, multiple algorithm outputs may be linked together to create a high confidence GA-USR label.

Figure 3:
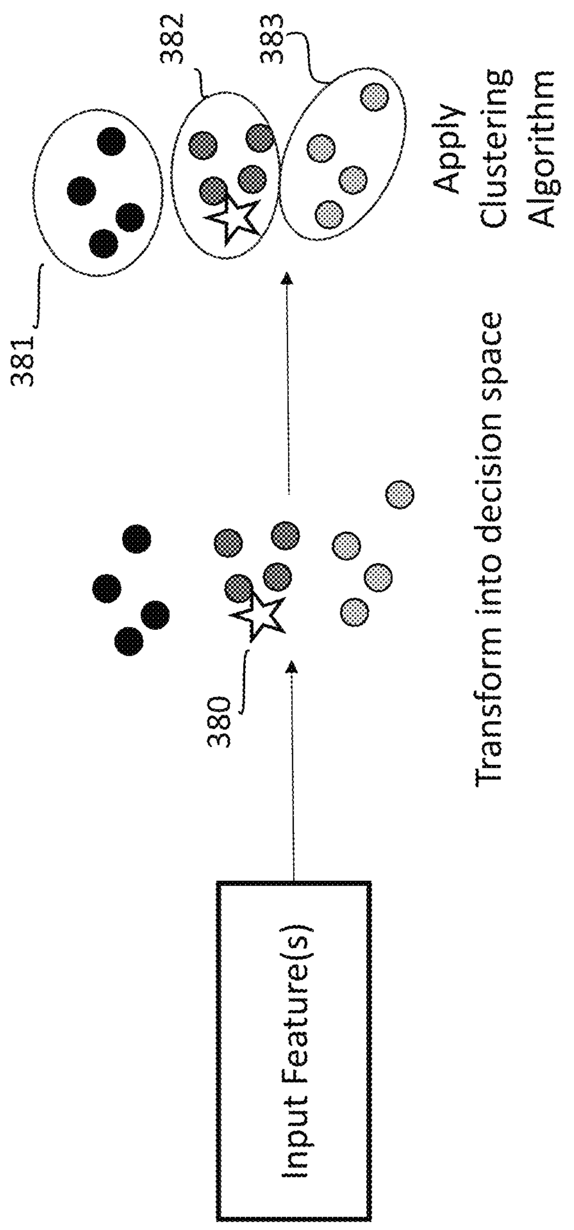
FIG. 3 illustrates a technique for RF emitter clustering

FIG. 3 illustrates an extract, transform, and load process for preparing clusters of RF emitters and filtering them into clusters for ultimate listing of geolocations in a preferred emitter list. In a first step, the features extracted from a geolocation by the RF analysis engine 205, are transformed into a decision space. This decision space can be multi-dimensional, where emitters that share similar features can be grouped into clusters together.

According to an embodiment, the RF signal analysis engine 205 may be configured to apply a filter to the initial labeled dataset 235 to generate a filtered initial labeled dataset, and the RFML prediction module 230 may be configured to receive the filtered initial labeled dataset. The RFML prediction module 230 may generate the enhanced labeled dataset 240 based on the received filtered initial labeled dataset. For example, the RF signal analysis engine 205 may apply a filter to the initial labeled dataset 235 using geospatial knowledge of feasible emitter locations to generate the filtered initial labeled dataset with lower label noise (e.g., falsely labeled data) and sufficient volume to train the RFRM. Alternatively, filtering may be used to remove mathematical outliers whose features are very dissimilar to the other datapoints in the preferred emitter list.

In FIG. 3, this mathematical filtering process is shown by applying the filter to a feature datapoint 280 that has been transformed into a decision space where datapoints closer together indicate greater feature similarity. A threshold is applied to all feature clusters 381, 382, and 383 of four datapoints each, using a clustering algorithm. As new datapoints are projected into the decision space, these thresholds can be used to filter outliers that do not belong to any cluster.

In FIG. 3, this clustering process may be performed in a two dimensional or multi-dimensional decision space or use a graph database of interconnected nodes. The clustering algorithm will be dependent on the decision space it must define the thresholds for, such as clique detection in a graph-based decision space. For different emitter detections by the GA-USR algorithm, the optimal decision space and cluster algorithms will be tuned based on the type of derived expert features, the geospatial filtering performance, and the known emitter data feeds that are available for labeled dataset generation.

In a final step of the passgroup processing, the RF signal analysis engine 205 may identify a subset of high value emitters (a preferred list of emitters) based on the one or more clusters of RF signal features. The preferred emitter list of high value emitters may be viewed as a set of associations where the cluster of RF signal features is spatially close within the decision space to a known emitter association. A known emitter association provides verified feature datapoint(s), such that all RF emitters sharing highly similar features can be identified as the known emitter. This final step allows for new datapoints to be projected into the decision space and classified as a specific RF emitter contained within the list of preferred emitters.

In an embodiment, the preferred emitter list may be expanded by adding RF characteristics discovered when training machine learning models. By expanding the preferred emitter list using machine learning (ML) derived features, the RF signal analysis engine 206 may be better able to separate RF pulses and group them into RF bursts. For example, if a cluster is associated with a known emitter that itself has a history of being near clusters with the same RF parameters, then redefining the thresholds may result in the clusters being merged, even if they are truly two separate emitters. However, expanding the preferred emitter list with the ML derived features has a potential to significantly reduce this behavior.

In this manner, the RFML prediction module 230 may generate an RF signal recognition model (RFRM) based on machine-learning performed using the iterative sets of labeled training data. For example, RF signal analysis engine 205 is configured to: i) generate a first labeled dataset that includes a respective label for each respective RF signal in an initial set of grouped or clustered RF signals (e.g., deinterleaving outputs) and ii) generate a second, different labeled dataset in response to machine-learning computations that are performed using the respective labels for each respective RF signal in the initial grouped or clustered set of RF signals. As would be understood by those skilled in the ML arts, the RFML prediction module is not limited to use of ML, but may generate the RFRM by using “advance analytics” (i.e., non-ML processing), statistical ML and deep learning algorithms.

This second, different labeled dataset corresponds to a first iteration of the enhanced labeled dataset 240 that is generated as an output of a feedback loop implemented at RF signal analysis engine 205. In some implementations, the RFML prediction module 230: i) generates multiple iterations of second, different labeled datasets, ii) uses the feedback loop to apply signal processing functions to each second, different labeled dataset, and iii) generates a corresponding enhanced labeled dataset 240 from a given second, different labeled dataset. For example, the RF signal analysis engine 205 feeds each iteration of a second labeled dataset 235 through some (or all) of the above described deinterleaving, geolocation, and assignation processes to generate a corresponding enhanced labeled dataset 240.

In some implementations, the RFML prediction module 230 receives or obtains data/control signals from each of the DSP Module 217, deinterleaving module 215, and geolocation module 220, and uses those data/control signals to generate different iterations of enhanced labeled dataset 240. As described herein, the RFML prediction module 230 may generate a trained (or optimized) RF signal recognition model based on machine-learning performed using the iterative sets of labeled training data.

For example, the RFML prediction module 230 may iteratively or repeatedly apply its machine-learning processes across the different iterations of enhanced labeled dataset 240 to generate an initial, or subsequently optimized, version of the trained RF signal recognition model. Fine-tuned modules may also be optimized by an ensembling process. Hence, the RFML prediction module 230 is configured to optimize its computational approach (e.g., the approach applied by the trained RF signal recognition model) for performing unique signal recognition of emitter-based RF energies based on this iterative or repeated processing. The RF signal analysis engine 205 may then use the trained RF signal recognition model to process a set of input data 210 to generate a signal recognition output 250.

Figure 4:
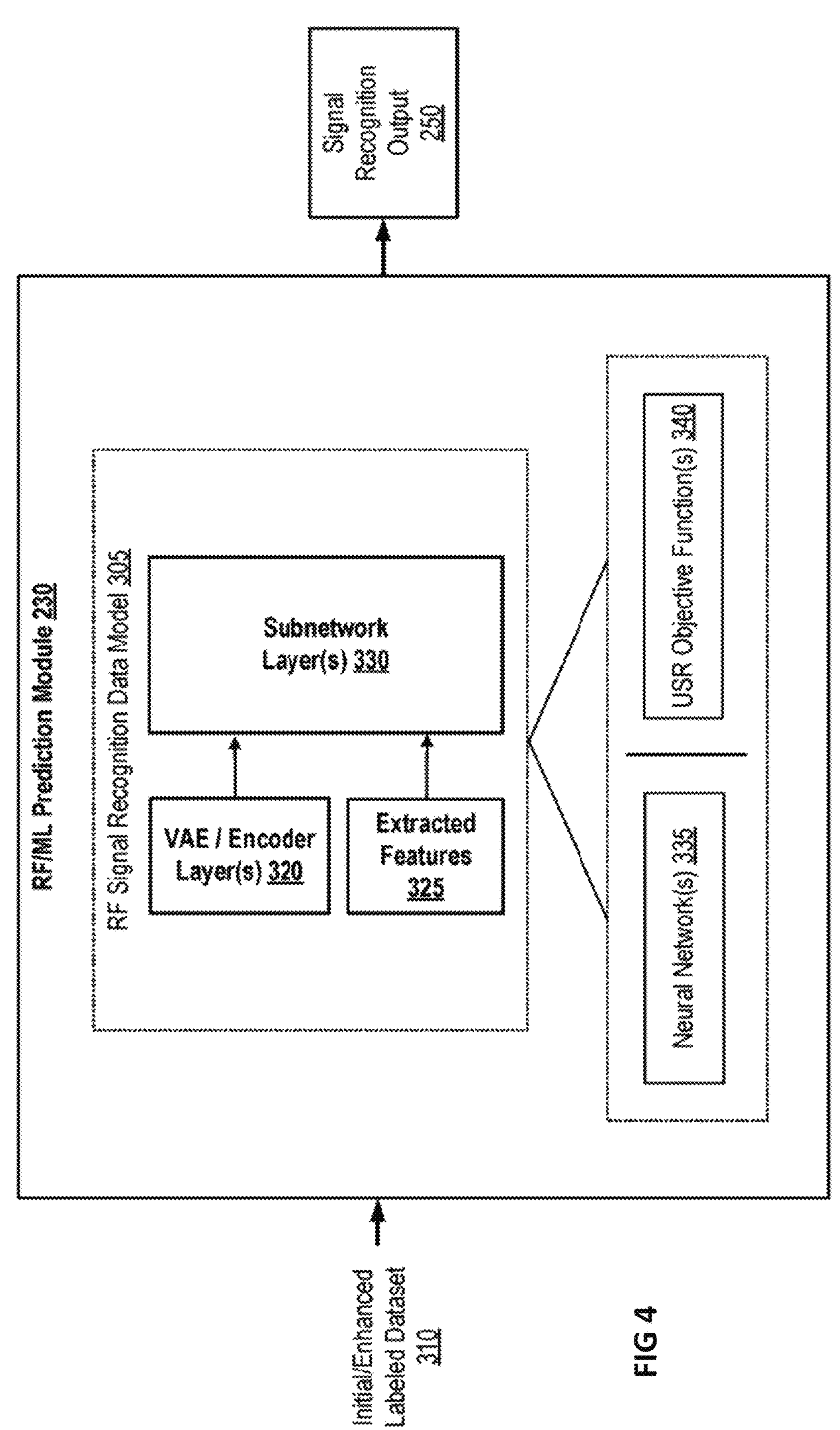
FIG. 4 illustrates a radio frequency machine-learning (RFML) prediction module, according to an embodiment.

FIG. 4 illustrates an example RFML prediction module 230 of the RF signal analysis engine 205 described above with reference to FIG. 2. In the example of FIG. 4, the RFML prediction module 230 includes an RF signal recognition data model 305 that processes an input dataset 310 to generate a signal recognition output 250. The RFML prediction module 230 may be implemented using at least an arrangement of one or more encoder layers 320, feature layers 325, and subnetwork layers 330. In some implementations, the RF signal recognition data model 305 is a representation of the trained (or untrained) version of the data model described earlier with reference to the example of FIG. 2. The foregoing description may relate to 1-NN but, as would be understood by those skilled in the art, is not limited thereto.

Each of the RF signal analysis engine 205, RFML prediction module 230, and RF signal recognition data model 305 may be accessed by, or included in, one or more computer systems of system 100, such as the receiver station 120 described earlier with reference to FIG. 1A. For example, each of the RF signal analysis engine 205, RFML prediction module 230, and RF signal recognition data model 305 may be included in the receiver station 120 as a sub-system of hardware circuits, such as a special-purpose circuit, that includes one or more processor microchips. In some implementations, the special-purpose circuits are hardware accelerators or special-purpose neural network processors that may implement one or more neural networks 335 (described below).

Although a single RF signal analysis engine 205 and RFML prediction module 230 is shown in the examples of FIG. 2 and FIG. 4, respectively, in some cases receiver station 120 or system 100 may include multiple RF signal analysis engines 205 as well as multiple RFML prediction modules 230. In general, each of the RF signal analysis engine 205 and RFML prediction module 230 may include one or more of the special-purpose processors described above, as well as a central processing unit (CPU), a graphics-processing unit (GPU), memory, and data storage devices. Each of the RF signal analysis engine 205 and RFML prediction module 230 may also be included in a computer system 500, which is described later with reference to FIG. 5.

In some alternative implementations, the neural networks 335 are machine-learning models that employ one or more layers of operations to generate an output, e.g., a classification, for a received input. Some neural networks 335 include one or more hidden layers in addition to an output layer. The output of each hidden layer is used as input to the next layer in the network, i.e., the next hidden layer or the output layer of the network. Some or all of the layers of the network generate an output from a received input in accordance with current values of a respective set of parameters.

Some neural networks 335 include one or more recurrent neural network layers. In general, recurrent neural networks (RNNs) are a class of neural networks that allow previous outputs to be used as inputs while having hidden states. For example, RNNs may be useful for modeling sequence data such as time-series or natural language datasets. Schematically, a recurrent neural network layer may use a for loop to iterate over the timesteps of a sequence, while maintaining an internal state that encodes information about the timesteps it has seen so far. Thus, RNNs may offer computational attributes that take into account historical information and include Long Short-Term Memory (LSTM) with one or more feedback connections.

In some implementations, the neural networks 335 are used by the RFML prediction module 230 to implement a class of modern ML approaches to time-series generation, prediction, translation, and data classification as RF recognition model 305. Each approach in the class uses a general structure including a pre-processing step that incorporates RF domain knowledge, an encoder 320 (e.g., in an embodiment, this may be a variational autoencoder) to extract features from the data, an optional mechanism to incorporate expert-derived feature extractors 325, and decision-making subnetworks 330 (e.g., a family of decision-making subnetworks) that are arranged to connect a latent space of the encoder 320 to the USR objective function. The encoder 320 may incorporate a structural provision for exploiting time-series data.

Geolocation-Aided Deinterleaving

Deinterleaving, in accordance with an embodiment, is aided by consideration of geolocation, thereby enhancing speed and accuracy of identifying and tracking a candidate emitter. Geolocation-aided deinterleaving combines precise time-of-arrival and frequency-of-arrival information for received bursts and time-varying position and velocity measurements for multiple receivers to improve either the process by which time-adjacent bursts become grouped into elements of the set $\hat{B}$ or to improve the functionality of the binary classifier D by extending the input of the classifier to include geospatially-relevant information. In some cases, for any candidate grouping $\hat{b}\in\hat{B}$ and any time-adjacent burst b', the RF signal analysis engine 205 may use information from multiple receivers to determine the geospatial likelihood of inclusion $b'\in\hat{b}$.

In some implementations, an example cross-ambiguity function (CAF) is denoted by $CAF_{\hat{b}}(R_1, R_2)$. This denoted CAF may be taken over the union of bursts in $\hat{b}$ from $R_1$ against the same time-adjacent subcollection from $R_2$. Since b' is time-adjacent to any burst $b\in\hat{b}$, the system 100 is operable to expect $TDOA(R_1, R_2)(b)\approx TDOA(R_1, R_2)(b')$ for any two receivers $R_1$, $R_2$ in the collection system. The same may hold for FDOA. Hence, adjusting for noise correlation, the RF signal analysis engine 205 may be configured to generate determinations corresponding to the following expressions:

$$b\in\hat{b}\Rightarrow CAF_{b'\cup\hat{b}}(R_1, R_2) > CAF_{\hat{b}}(R_1, R_2) \tag{4}$$

$$\text{and } b\notin\hat{b}\Rightarrow CAF_{b'\cup\hat{b}}(R_1, R_2) < CAF_{\hat{b}}(R_1, R_2). \tag{5}$$

This basic inequality allows us to apply geospatial information as input to the time-adjacent burst grouping process. In general, time difference of arrival (TDOA) is a technique applied or used by system 100 for geo-locating RF sources. In some implementations, the technique requires one or more receivers (or probes) capable of detecting signals of interest. Each probe may be synchronized in time to capture corresponding real (I) or imaginary (Q) (I/Q) data blocks. The system 100 in FIG. 1A is configured to shift a respective time signature of each I/Q dataset to determine a difference between the respective arrival time at each probe. Based on this computation, the system 100 may obtain the difference in a distance of the source from each set of probes and derive solutions to relevant distance equations to obtain the geolocation of the actual RF source. The system 100 is operable to combine TDOA and frequency difference of arrival (FDOA) measurement techniques to perform instantaneous geolocation in one or more dimensions.

In some implementations, the RF signal analysis engine 205 in FIG. 2 may be configured such that, if two bursts b, b' arise from non-time-adjacent subcollections, then the RF signal analysis engine 205 may still leverage geospatially relevant information to enhance or improve upon its implementation of the binary classifier D prior to attempting the geolocation process. Assuming multiple receivers, the RF signal analysis engine 205 may derive a set of measurements from each burst (e.g., after deriving burst groups $\hat{b}$,$\hat{b}$'):

$$TODA(R_i, R_j)(\hat{b}),\ FDOA(R_i, R_j)(\hat{b}), \tag{6}$$

$$TODA(R_k, R_l)(\hat{b}'),\ FDOA(R_k, R_l)(\hat{b}') \tag{7}$$

In some implementations, because the same two receivers need not be used to derive measurements for each burst, the RF signal analysis engine 205 may be configured to use arbitrary receiver indices $i\neq j$, $k\neq l$. The RF signal analysis engine 205 may also determine a covariance estimate for each measurement, taking into account $C/N_0$ for each burst. The RF signal analysis engine 205 may use these operations to determine a set of weightings to weight the importance of each measurement individually. The RF signal analysis engine 205 is configured to apply estimates for receiver position and velocity at times of arrival $TOA(R_{i,j})(\hat{b})$ and $TOA(R_{k,l})(\hat{b})'$, respectively.

From this, the RF signal analysis engine 205 may derive $\{S_q(x,y,z)\}$, $q\in 1, \ldots 4$, which represent a system of four nonlinear equations in three variables constraining the position of the emitter. The RF signal analysis engine 205 may then solve for the position of the emitter in three-space. Some solutions may be based on an assumption that the position is identical at the times in question. The RF signal analysis engine 205 may then minimize the system over all possible emitter positions using an appropriate norm N: $\mathbb{R}^4\rightarrow\mathbb{R}$ to derive a corresponding prediction g.

Using the $L^2$-norm, the RF signal analysis engine 205 is operable to determine a least-squares estimate minimizing $$\sum_{q=1}^{4}(S_q(x, y, z))^2.$$

While accounting for covariance on the original measurements, the RF signal analysis engine 205 may employ weighted least squares to minimize the system of equations. Working back through receiver position and velocity estimates, the RFML prediction module 230 may calculate residuals for each of the original estimates based on prediction g. Comparing these residuals to the covariance estimates, the RFML prediction module 230 may determine the probability of deducing prediction g given the assumption b and b' come from the same emitter location. The complement corresponds to the probability b and b' come from different locations.

For the non-time-adjacent case, a single receiver may prove sufficient to implement geolocation-aided deinterleaving (though the problem becomes more complex and less practical with only one receiver). For any collection, system 100 may employ an over-determined system of equations to constrain an emitter position, use that information to generate prediction g, and then evaluate an assumption (e.g., that the position of the emitter is fixed across all observations $\hat{b}$ in $\hat{B}$) against the measurement covariance statistics relying on that assumption. For instance, if it is assumed that an emitter uses the same center frequency throughout a collection, then for any four bursts $b_1$, $b_2$, $b_3$, $b_4$, the RF signal analysis engine 205 may derive three independent measurements:

$$\{FDOA(b_1, b_i) \mid 2 \leq i \leq 4\}, \tag{8}$$

and, using estimates for receiver position and velocity at times $TOA(\hat{b}_i)$ for $1 \leq i \geq 4$, determine a system of three equations constraining the position of the emitter under the prevailing assumption. Further constraining the emitter position by assuming it lies on the surface of the Earth, the RF signal analysis engine 205 may obtain an over-determined system of equations, and then may proceed as above.

According to an embodiment of the present disclosure, the segmentation sub-process of the deinterleaving module 215 may comprise using the extracted features of each RF burst to identify one or more additional RF bursts that were not segmented due to the signal to noise ratio trending downward. That is, the deinterleaving module 215 may be configured to identify additional RF bursts in input signal data based on features extracted from RF bursts that were initially identified. By identifying the additional RF bursts, the geolocation processes may produce more precise geolocations since more total energy from each emitter is used as a foundation for calculating the resulting geolocations, and the assignation processes may more accurately assign labels to more RF bursts, thereby improving the labeled training data.

RF Machine-Learning (RFML)-Unique Signal Recognition

The process executed by the RF signal analysis engine 205 includes an iterative execution of various processes and operations for application of RFML unique signal recognition. The processes and operations are executed or applied using the RFML prediction module 230 described earlier with reference to the example of FIG. 2. In general, through a network of processes involving deinterleaving (module 215), geolocation (module 220), and assignation (module 225) operations, the system 100 is operable to generate initial and enhanced versions of labeled input datasets. In some cases, the initial labeled dataset is an initial portion of training data to be processed using at least one neural network 335 of the RFML prediction module 230 as shown in FIG. 4.

For example, a labeled dataset may be received and processed at the RFML prediction module 230 based at least on the following machine-learning framework:

$$\mathcal{B} = \{(b, id(b)) \mid b \in A(G(B))\}, \tag{9}$$

where, B is the set of segmented bursts, $G(P) \subset P$ is the subset contributing to a geolocation, $A(G(P)) \subset G(P)$ is the subset for which the associated geolocation resolves to an emitter identity label via the assignation process, and id(b) is the associated identity label.

Each burst is a finite time series of complex-valued samples representing in-phase and quadrature components. Note that id(b) is a "noisy label" in the sense that each process in the GA-USR network is prone to error, and error at any point in the network may contribute to faulty assignation. This labeled dataset and expert feature extraction may make the USR problem tractable using a general class of modern ML approaches to time-series generation, prediction, translation, and classification. As indicated above with reference to the example of FIG. 4, each approach in the class uses a general structure including a pre-processing step that incorporates: i) RF domain knowledge, ii) a encoder to extract features from the data, iii) an optional, example mechanism to incorporate expert-derived feature extractors, and iv) a family of decision-making subnetworks that are arranged to connect the output of ii) and iii) (e.g., encoder layers 320, feature layers 325) to the USR objective function 340. The encoder 320, which may include VAE or similar encoding processing, can incorporate a structural provision for exploiting time-series data.

An example of the class will now be described in fuller detail, beginning with a discussion of preprocessing in a GA-USR data processing pipeline. RF preprocessing normalizes the input set $\mathcal{B}$ to remove distinguishing properties of the input data time series that known, e.g., from the standpoint of RF processing expertise, not to contribute to the USR objective function. For instance, if the receivers are in low-Earth-orbit and the emitters are maritime vessels, then the RF signal analysis engine 205 may be configured to normalize peak or median time series amplitude across all labeled input series.

Similarly, the RF signal analysis engine 205 is operable to tune input series center frequencies such that the FFT bin with maximum amplitude is the same bin across all input samples for some uniformly chosen number of FFT bins. In either case, relative, time-varying positions and velocities between the receivers and emitters (none of which informs the decontextualized identity of the emitters) may impact the normalized qualities of the input series. In some implementations, the RF signal analysis engine 205 applies normalization in the preprocessing stage to minimize the effects of these confounding properties in the data, thereby streamlining (or simplifying) the processing workload at the follow-on stages of a GA-USR data processing pipeline.

In general, the encoder 320 may be viewed as having an ML tool for training for feature extraction. In an embodiment, the encoder may be a ML-building block capable of performing dimensionality reduction on input series in such a way that reconstruction of the original series is part of the objective function. The encoder may be comprised of separate encoding and decoding subcomponents, and may also incorporate a regularization term (e.g., KL-divergence minimization, which may be variational) into the objective function 340 to prevent overfitting. The encoder projects data into a latent space of random variables, and the construction of the regularization term in this probability space forces the decoder to learn a meaningful connection between Euclidean distance in the associated sample space and similarity in the input space.

The reconstructive and regularizing components combined with the dimension-reducing properties of the encoder layer combine in such a way that the encoder layer essentially learns to extract features from input data and sampled data from the latent space of the encoder is suitable input for the follow-on network layer defining the USR objective function 340. To utilize a standard encoder, the RFML prediction module 230 may simply ignore the time series structure of the input data, treating labeled input as one-dimensional vectors, such that the standard encoder may enable the larger RFML USR. The RF signal analysis engine 205 is operable to denote by E(b) the projection of an input burst through the encoder or a particular selected encoder.

Going a step further, the RF signal analysis engine 205 processes time series data that lends itself to a specialized family of encoders incorporating sequential learning structures (e.g., for time series), such as attention or RNNs within the encoder/decoder pair. For instance, the system 100 may incorporate an auto-encoder structure, which may combine attention with variational training components, for human language processing. Contrastive learning methods may also be leveraged as a means to quantify similarity within complex feature spaces.

The techniques disclosed in this document may also addresses a "bypassing" phenomenon common to many hybrid sequential and variational models. By the addressing this phenomenon, the system 100 allows the decoder to not only learn generative behavior to reconstruct inputs from the output of the encoder layer, but also that the output of the encoder layer in the latent space represents meaningful information for input sequence reconstruction and for other follow-on processes. The system 100 may optionally incorporate a similar hybrid ML network that uses LSTM for time series data from sensors The system 100 may also combine an example Transformer network with variational training for feature extraction.

In some implementations, the RFML prediction module 230 uses these deep learning network structures and other comparable networks, alone or in combination, substituting input time series for the exemplar input data. The RFML prediction module 230 may progress using the output of the encoder 320 as a feature space, and may also, under some circumstances, combine these features with expertly-derived features, such as those used for deinterleaving. For example, to do this, a new feature space (e.g., real vector space) is composed by taking the direct product of the learned and expertly-derived feature spaces. To reduce complexity at the follow-on network layer defining the USR objective function 340 or to encourage improvements in learned features through the encoder, the RFML prediction module 230 is operable to learn a lower-dimensional composition of the two spaces in the following way.

RFML prediction module 230 may be configured to incorporate both expertly-derived and learned features. For example, the RF recognition model 305 may provide a computational benefit of approximating expertly-derived features in response to training the network to approximate expertly derived features (e.g., by using the expertly derived features themselves). In this manner, a larger network of the RF recognition model 305 or an ensemble of models may be tuned to more efficiently learn information that an expert might not have considered.

Overall performance of even a larger network of the RF recognition model 305 can also outperform networks that are trained using expert features alone. In general, by training a network using various sets of learned features (e.g., expert and non-expert features), the RFML prediction module 230 may uncover relationships and connections in a set of data that may be unintuitive or otherwise not exposed through expert feature extraction alone. In some cases, experts often know features in the data that are important relative to the objective function, but it may be challenging for certain data models to learn these features to a level equivalent to that of an expert.

Thus, a technique for optimizing performance of the RFML prediction module 230 may include using a set of known expertly-derived features to seed the network. The training process for the network may then be focused on the orthogonal complement of information in the set. Based on this training process, the RFML prediction module 230 may generate an RF recognition model with a baseline performance that may match (or substantially match) the expertly derived features. This model may also have the capability to learn relevant features that may go undetected by an expert. In some implementations, the training process yields a model that is uniquely optimized to determine just this type of otherwise undetectable information. For example, by applying contrastive learning techniques a model may be trained using expert derived features and identify higher-level features within the data that provides greater separation between devices with similar features.

According to an embodiment, n may be used to denote the dimension of the expertly-derived feature vectors. The RFML prediction module 230 may estimate the dimensionality of the encoder feature space: $n' \leq n$. The system 100 may then choose n' and the dimensionality m of the encoder feature space such that $n' < m$ and m is small enough to affect meaningful reduction from the dimensionality of the input space to the dimensionality of the encoder feature space to preserve the dimensionality reduction of the encoder layer. The example network 335 of the RFML prediction module 230 may incorporate a fully connected layer $FC_e$ of size n, n' that takes, as input, expertly-derived feature vectors and another fully-connected layer $FC_l$ of size m, n' taking as input the m-dimensional latent space vectors.

By tuning the objective function 340 to minimize divergence between $FC_e$ and $FC_l$, such as by adding a mean squared error term, the encoder can be incentivized to learn an approximation to the expertly-derived features (the support of $FC_l$), and may interpret the kernel of FC to be the contribution of the latent feature space orthogonal to the expertly-derived features.

Approximating the expertly-derived features is useful if, for instance, the process to compute those features is computationally costly. Isolating the kernel allows us to use the projection of a latent feature vector into the kernel as a new feature for deinterleaving. By priming the network to learn an approximation to the expertly derived features, the network may more quickly converge. By prompting the network to converge to local minima where a subspace of the latent feature space approximates the expertly-derived feature space well (e.g., above an approximation threshold), the training may more effectively focus on optimizing latent features that may not have been considered as relevant.

The RFML prediction module 230 may use the potential of the encoder feature space to contribute to the ultimate goal of USR by connecting the network to one or a family of decision-making subnetworks. In some implementations, a family of convolutional neural network (CNN) classifiers (e.g., AlexNet instances) fed from the encoder feature space can accomplish the USR task. Each CNN classifier is trained on labeled input (E(b), id(b)) for (b, id(b))$\in\mathcal{B}$. In some cases, backpropagation through the encoder is optional and may benefit encoder training with respect to the USR objective function 340. The number of output states may be as few as two, in which case the classifier discriminates between bursts from a single emitter and burst from all other emitters. In this instance, a separate decision-making layer may be required for each distinct emitter that a user wishes to track. The system 100 may combine multiple targeted emitters within a single decision-making subnetwork 330 by expanding the number of classification bins within the subnetwork.

Each emitter that is being tracked, up to the entire set $\{id(b)|(b, id(b))\in\mathcal{B}\}$, may be represented by a bin in at least one of the decision-making subnetworks 330. In some implementations, each subnetwork 330 in the family is trained independently of the others. Rather than making a hard decision within each network, the RFML prediction module 230 may be configured to preserve a probabilistic output of a softmax layer at a terminus of each decision-making network. In some implementations, to realize the full USR application, the RFML prediction module 230 combines the output of the decision-making network family when running inference through the combined trained model.

According to an embodiment of the present disclosure, the decision-making subnetworks 330 may be implemented such that specific labels need not be retrained, thereby improving an efficiency over time of the RF signal analysis engine 205. The RFML prediction module 230 may perform this function by, for example, selecting the bin with the highest total probability. Alternatively, the RFML prediction module 230 may include a classifier of classifiers (e.g., implemented as another CNN classifier) that takes, as input, the "soft" probabilistic values of the decision-making subnetwork family and that is trained to make a final decision using the labeled data.

Figure 5:
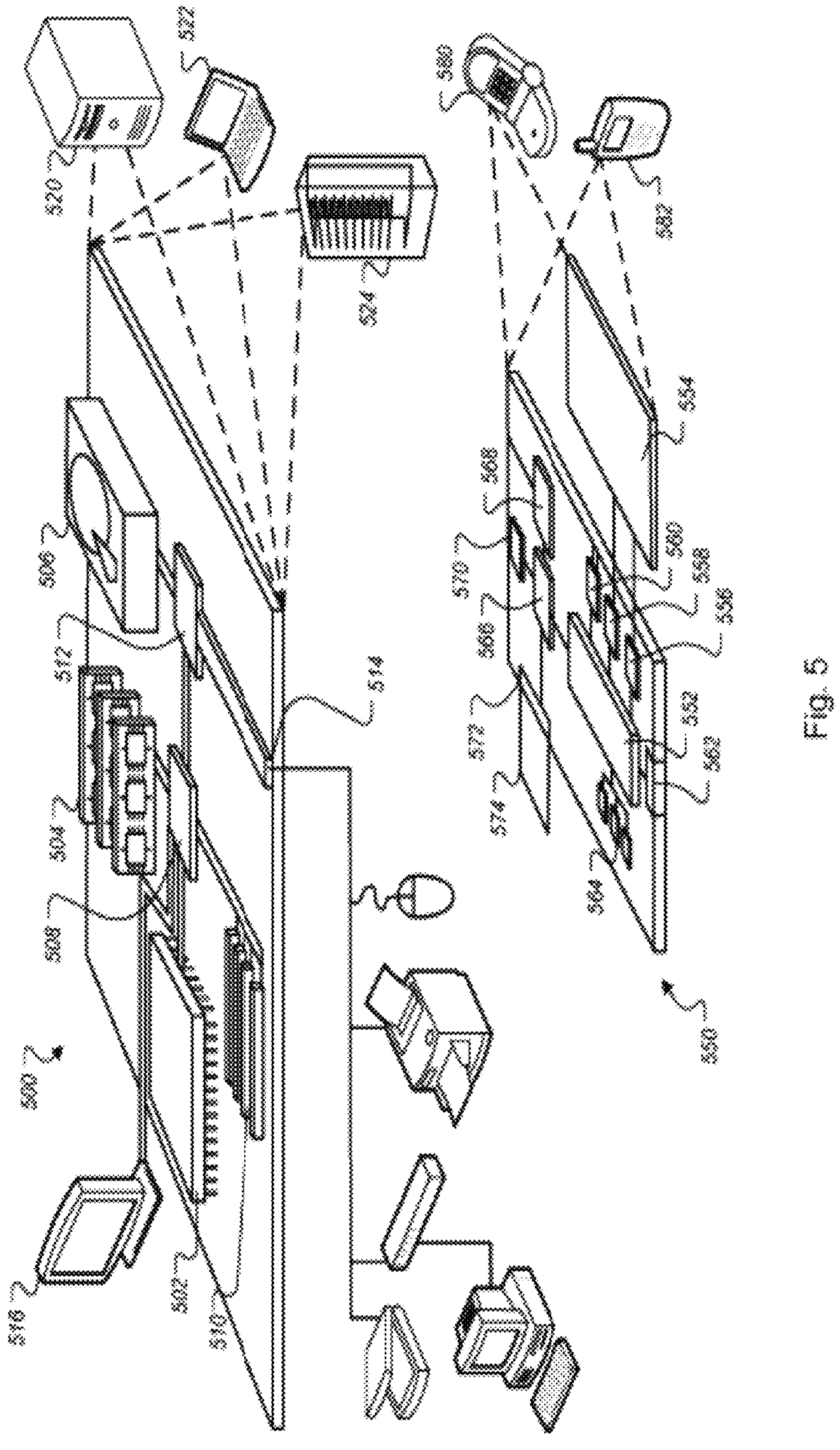
FIG. 5 is a block diagram of a computing system, according to an embodiment.

FIG. 5 is a block diagram of computing system/devices 500, 550 that may be used to implement the systems and methods described in this document, either as a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 may process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Multiple computing devices 500 also may be connected, with each device providing portions of the disclosed operations (e.g., as a server bank, a group of blade servers, or a multi-processor system).

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

According to an embodiment, the memory may store information about an artificial intelligence model including a plurality of layers. In this configuration, storing information about the artificial intelligence model may refer to storing various information related to the operation of the artificial intelligence model, for example, information on a plurality of layers included in the artificial intelligence model, information on parameters used in each of the plurality of layers (for example, filter coefficients, weights, bias, etc.). For example, the memory may store a neural network model according to an embodiment of the disclosure.

According to an embodiment, the neural network model may be a model learned to recognize and locate targeted RF signal emitters based on a collection of RF signals. For example, the neural network model may be a model learned to output signal recognition data comprising an identity and a location of one or more target RF signal emitters, at one or more different times, based on input data comprising a collection of RF signals. As another example, the neural network model may be a model learned to output the signal recognition data corresponding to each identifiable RF signal emitter from the collection of RF signals.

According to an embodiment of the disclosure, learning the artificial intelligence model may mean that a basic artificial intelligence model (for example, an artificial intelligence model including an arbitrary random parameter) is learned using a plurality of training data by a learning algorithm, and thus a predefined action rule or artificial intelligence model set to perform a desired characteristic (or purpose) is generated. Such learning may be performed through a separate server and/or system, but is not limited thereto, and may be performed in the RF signal analysis engine 205. Examples of the learning algorithm include, for example, and without limitation, supervised learning, unsupervised learning, semi-supervised learning, transfer learning or reinforcement learning, but are not limited to the examples described above.

Each of the artificial intelligence models may be implemented as, for example, convolutional neural network (CNN), deep neural network (DNN), recurrent neural network (RNN), restricted Boltzmann machine (RBM), deep belief network (DBN), bidirectional recurrent deep neural network (BRDNN) and deep Q-networks, but is not limited to the examples described above.

The processor 502 for executing the artificial intelligence model according to an embodiment of the disclosure may be implemented through a combination of a general-purpose processor such as, for example, and without limitation, a general-purpose processor such as a CPU, AP, or a digital signal processor (DSP), a graphics-only processor such as a GPU, a vision processing unit (VPU), or an artificial intelligence-only processor such as an NPU. The processor 502 may control to process input data according to a predefined operation rule or an artificial intelligence model stored in the memory. Alternatively, when the processor 502 is dedicated processor (or artificial intelligence dedicated processor) the dedicated processor may be designed with a hardware structure specialized for processing a specific artificial intelligence model. For example, hardware specialized for processing a specific artificial intelligence model may be designed as a hardware chip such as an ASIC or FPGA. When the processor 502 is implemented as a dedicated processor, it may be implemented to include a memory for implementing an embodiment of the disclosure, or may be implemented to include a memory processing function for using an external memory.

According to another example, the memory may store information about an artificial intelligence model including a plurality of layers. In this configuration, storing information about the artificial intelligence model may refer to storing various information related to the operation of the artificial intelligence model, for example, information on a plurality of layers included in the artificial intelligence model, information on parameters used in each of the plurality of layers (for example, filter coefficients, bias, etc.).

The storage device 506 is capable of providing mass storage for the computing device 500. In one implementation, the storage device 506 is a computer-readable medium. In various different implementations, the storage device 506 may be a hard disk device, an optical disk device, or a tape device, a flash memory or other similar solid-state memory device, or an array of devices, including devices in a storage area network or other configurations. In one implementation, a computer program product is tangibly embodied in an information carrier. The computer program product includes instructions that, when executed, perform one or more methods, such as those described above. The information carrier is a computer- or machine-readable medium, such as the memory 504, the storage device 506, or memory on processor 502.

The high-speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the FIGURE. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may include one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 may process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication (e.g., via a docking procedure) or for wireless communication (e.g., via Bluetooth or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product includes instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry in some cases. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, Wi-Fi, or other such transceiver (not shown). In addition, GPS receiver module 570 may provide additional wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the FIGURE. For example, it may be implemented as a cellular telephone 580. It may also be implemented as part of a smartphone 582, personal digital assistant, or other similar mobile device.

Various implementations of the systems and techniques described here may be realized in digital electronic circuitry, integrated circuitry, specially designed ASICs, computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

As discussed above, systems and techniques described herein may be implemented in a computing system that includes a back-end component, e.g., as a data server, or that includes a middleware component such as an application server, or that includes a front-end component such as a client computer having a graphical user interface or a Web browser through which a user may interact with an implementation of the systems and techniques described here, or any combination of such back-end, middleware, or front-end components. The components of the system may be interconnected by any form or medium of digital data communication such as, a communication network. Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, in some embodiments, a user's identity may be treated so that no personally identifiable information may be determined for the user, or a user's geographic location may be generalized where location information is obtained (such as to a city, ZIP code, or state level), so that a particular location of a user may not be determined. Thus, the user may have control over what information is collected about the user, how that information is used, and what information is provided to the user.

Figure 6A:
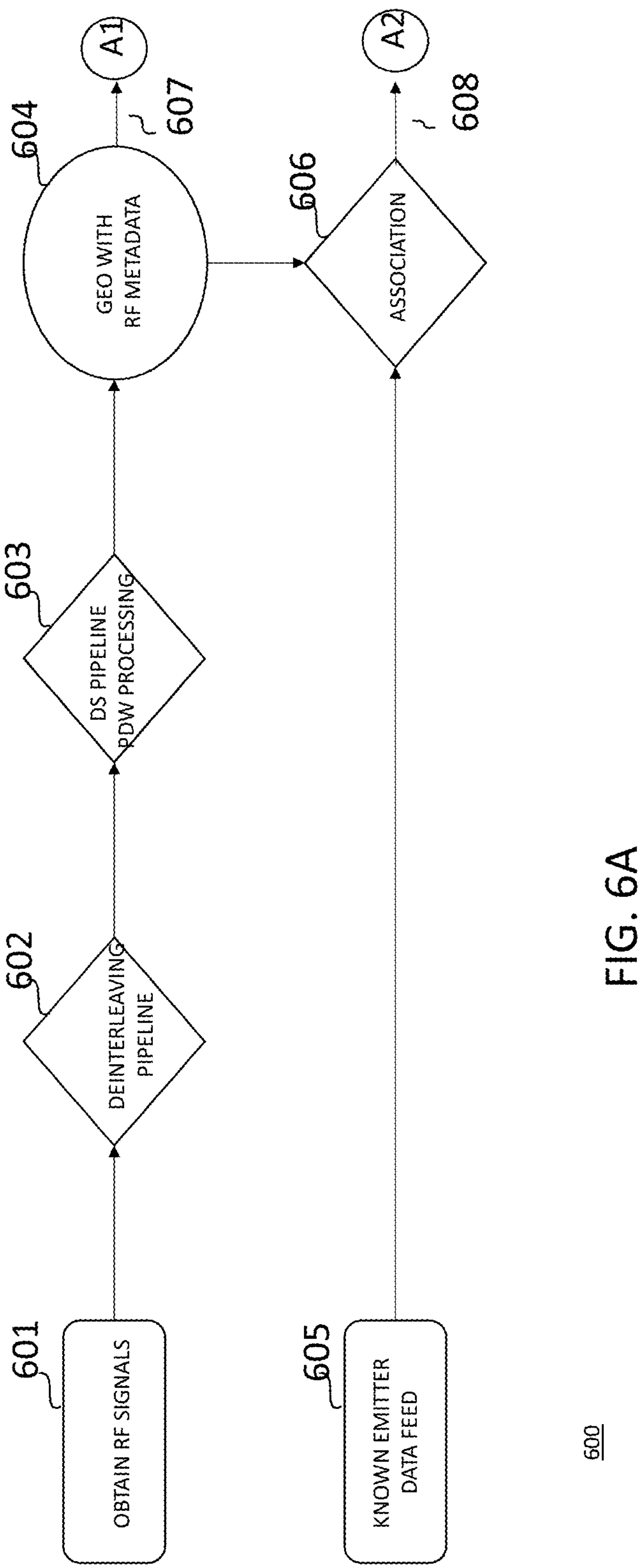
FIG. 6A illustrates a block diagram of a process for implementing passgroup processing and geolocation formation in connection with an initialization operation using geolocation-aided unique signal recognition, according to an embodiment.
Figure 6B:
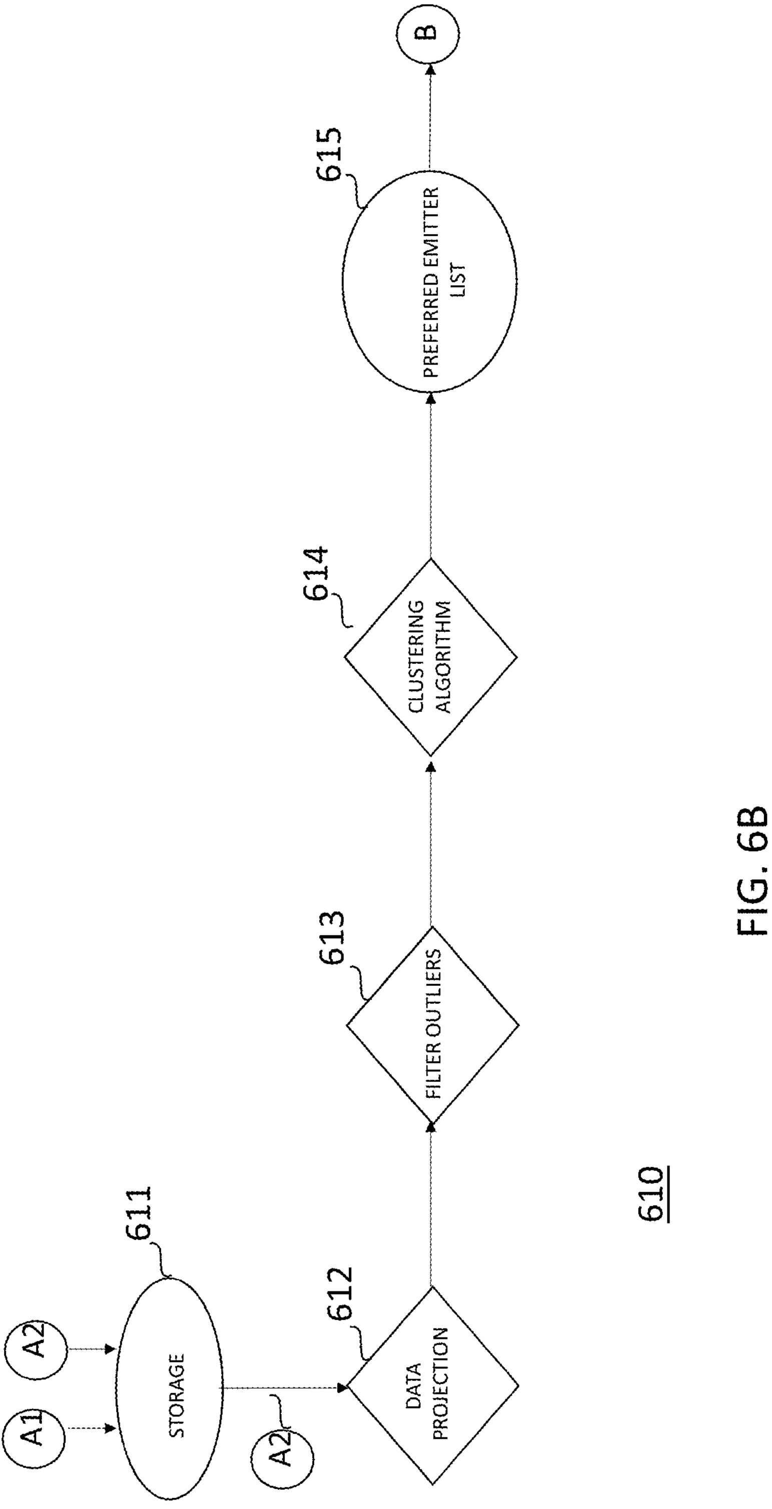
FIG. 6B illustrates a block diagram of a process for forming a list of preferred GEOs during an initialization operation, according to an embodiment.
Figure 6C:
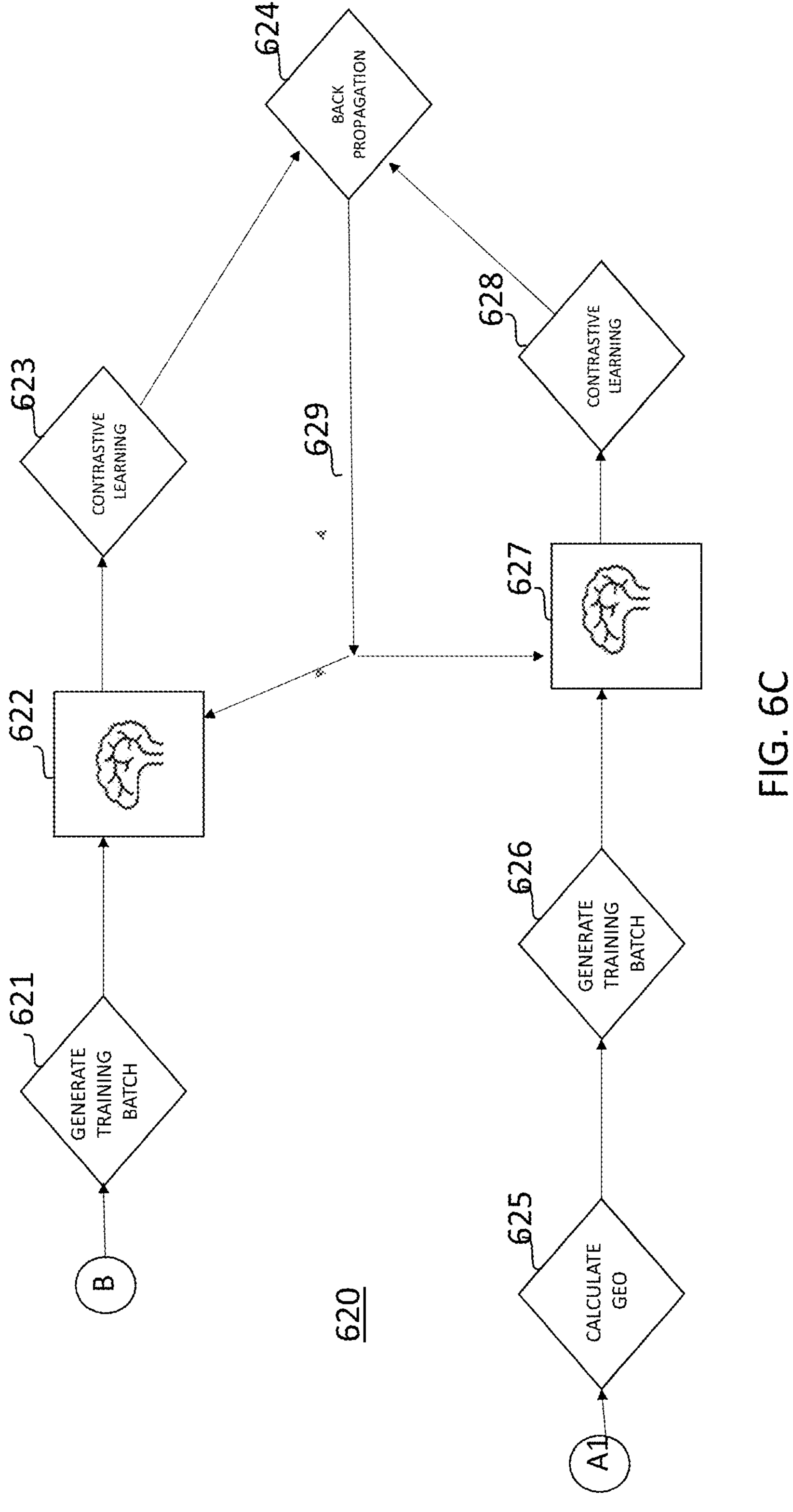
FIG. 6C illustrates a block diagram of a process for training the RFRM with contrastive loss during an initialization operation, according to an embodiment.

FIGS. 6A-6C illustrate block diagrams of a process for initializing geolocation-aided unique signal recognition (GA-USR), with reference to the system illustrated in FIG. 2, according to an embodiment. The process may be viewed as a sequence of four sub-processes, each respectively illustrated in FIGS. 6A-6C and designated as "passgroup processing and associated geolocation formation." Each passgroup is a snapshot of an emitter output taken by a satellite constellation at approximately the same time, as illustrated in FIG. 1E. Multiple passgroups that collect against the same emitter are formed over time as the satellite constellation travels in orbit. The first subprocess 600 is directed to passgroup processing and associated geolocation formation, having as an input RF signals and a known emitter data feed, such as AIS information, a database that tracks fixed emitter sites around the work, or a hand-crafted list of known reference points from an RF analyst. The output is a set of labeled bursts comprised of geolocations with associated RF metadata in a first path 607 and geolocations with both associated RF metadata and identity information, if available, in a second path 608. The output of the first path 607 is output at junction A1 and the output of the second path 608 is output at A2 in FIG. 6A.

The second subprocess 610, which receives the output A2 as an input to a storage 611, is directed to the formation of a list of preferred emitters of geolocations at its output B.

The third subprocess 620 is directed to the initial training of a machine learning model and will receive the preferred emitter list output B of subprocess 610 as well as the geolocations and RF metadata output A1 from subprocess 600. The third subprocess will process the input B using contrastive loss models to compute similarity along a first path as a first basis for the generation of a first feedback component from back propagation 624 to the ML model 622 and will process the input A1 using contrastive loss models along a second path as a basis for the generation of a second feedback component from back propagation 624 to the ML model 627. While two ML models 622 and 627 are shown, in practice they may be the same RFML model 230 and the feedback output 629 will provide the iterative training of the RFML prediction model 230.

Referring again to FIGS. 2 and 6A with respect to the passgroup processing and geolocation formation process 600, the RF signal analysis engine 205 may obtain a collection of RF signals values 210 as an input step 601. The RF signal analysis engine 205 may provide the RF signals 601 as an input to the deinterleaving module 215 and DSP module 217. At 602, the deinterleaving module 215 in cooperation with the DSP module 217 may perform a segmentation sub-process 602 to identify RF pulses in the RF signals and group the RF pulses into RF bursts or clusters.

At 603, the deinterleaving module 215 in cooperation with the DSP module 217, together forming a pipeline or chain for processing, may perform a feature extraction sub-process to extract a set of features from the identified RF pulses, and extract a set of ensemble features from the groups of RF pulses (e.g., RF bursts). Based on the extracted features and ensemble features, the deinterleaving module 215 may assemble the RF signals into possible groupings or "clusters" of RF bursts by emitter for formation of the preferred emitter list in subprocess 610. The deinterleaving module 215 may output the possible groupings or clusters of RF bursts by emitter, and the RF signal analysis engine 205 may provide the possible groupings or clusters of RF bursts as an input to the geolocation module 220.

The foregoing operations in steps 602 and 603 may be viewed as resulting in deinterleaving-aided segmentation. In such segmentation, existing features are used to determine where other bursts should be within a collection, where such bursts are not segmented due to SNR trending downward. In such cases, hypothesis testing (such as the use of cross ambiguity functions) may be used to determine whether a burst is present at all. The deinterleaving-aided segmentation may be used where at least one burst has not been identified and the hypothesis to be tested is that the burst is present (potentially beneath the noise or an interfering burst).

At step 604, the geolocation module 220 within RF signal analysis engine 205 may obtain the possible groupings or clusters of RF bursts by emitter as an input from the processing chain executing steps 602 and 603, and in combination determine one or more candidate locations (e.g., estimated geolocation) for an emitter based on the group of RF bursts for the emitter. Step 604 results in a sequence of geolocations with related RF metadata, that is, the geolocation module 220 may provide one or more candidate locations for each RF burst (e.g., candidate location data) as an output A1 that serves as an input to the training processing 620. The output of step 604 also serves as an input to the assignation module 225 for processing in step 606.

At step 606, the assignation module 225 may use an association algorithm to obtain the possible groupings of RF bursts by emitter and the candidate location data, and determine an identity of each emitter. That is, each emitter may be associated with a responsible entity (e.g., vessel, corporation, nation-state, non-governmental organization, etc.), and the assignation module 226 may determine which entity corresponds to each emitter. For example, the assignation module 225 may obtain an AIS data stream 605 that includes one or more associations between an emitter and a corresponding entity. The assignation module 225 may label each RF burst with an identity of the corresponding emitter, and output the labeled data at output A2 as an input to the second sub-processing module 610 for preferred list processing.

Figure 7A:
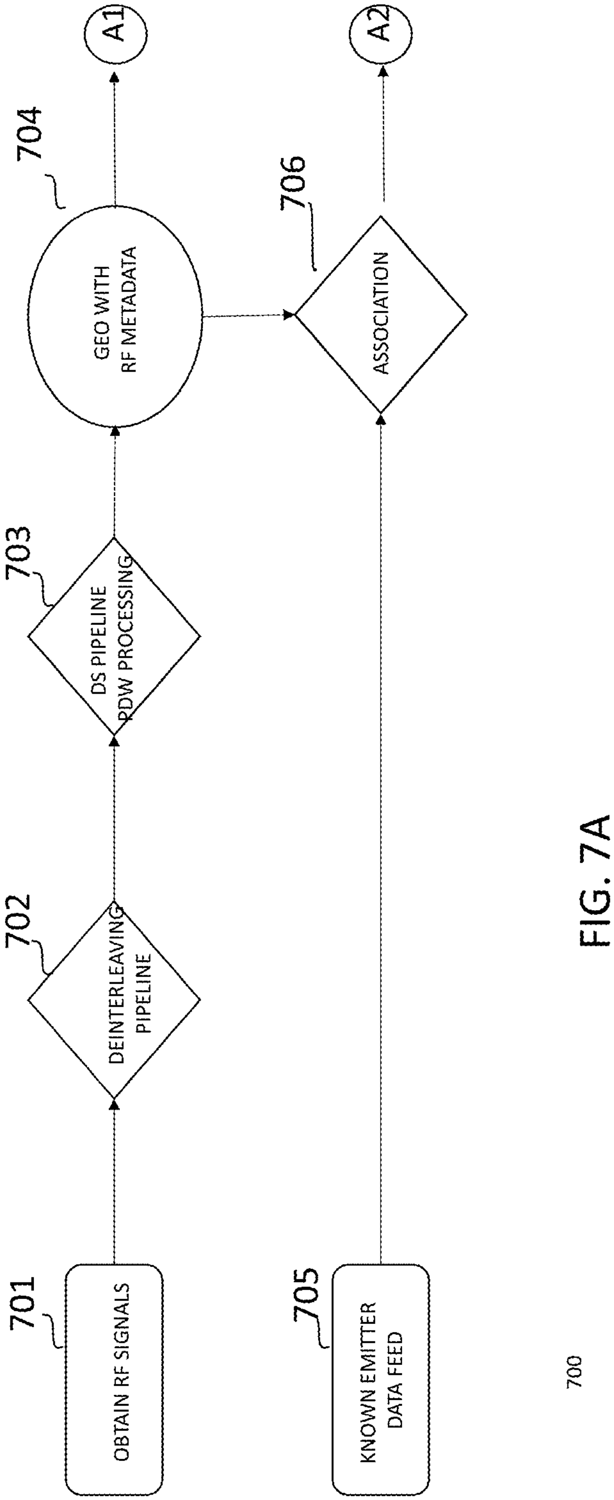
FIG. 7A illustrates a block diagram of a process for implementing passgroup processing and geolocation formation in connection with a steady-state operation using geolocation-aided unique signal recognition, according to an embodiment.
Figure 7B:
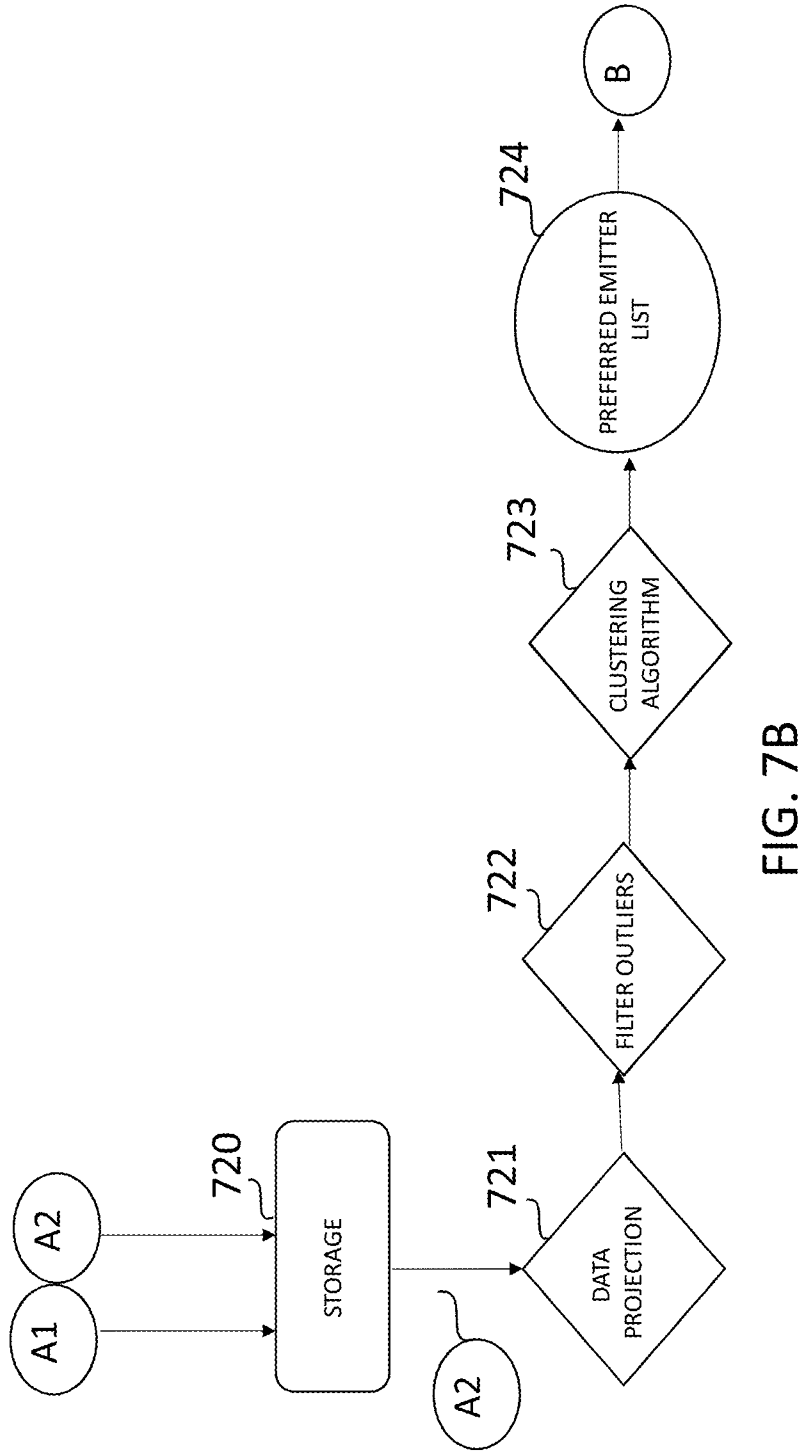
FIG. 7B illustrates a block diagram of a process for forming a list of preferred GEOs during an initialization operation, according to an embodiment.
Figure 7C:
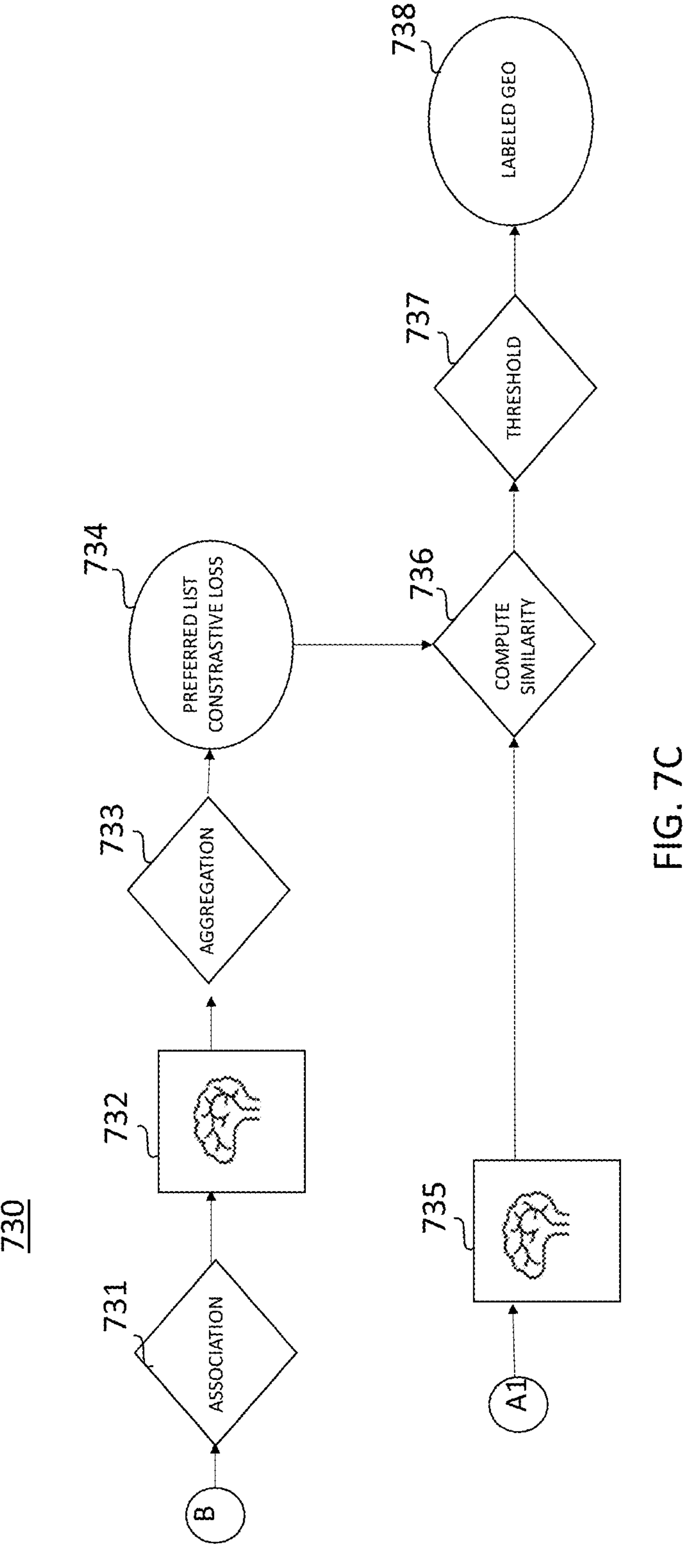
FIG. 7C illustrates a block diagram of a process for obtaining a USR inference during a steady state operation, according to an embodiment.

Referring to FIG. 2 and the preferred emitter list generation subprocess 610 in FIG. 6B, the output of the geolocation module 220 (geolocation and RF metadata output A1 in FIG. 6A) and an output of the assignation module 225 (geolocation, RF metadata, and emitter ID output A2 in FIG. 6A) may be placed into a historical storage 611 for access during subsequent processing, during the initialization process (FIGS. 6A-6C), the steady state process (FIG. 7A-7C). In the process of FIG. 6B, the RF signal analysis engine 205 may further process an output of the assignation module 225 (output A2 in FIG. 6A). At step 612, the RF signal analysis engine 205 may provide the candidate location data to the RFML prediction module 230. The RFML prediction module 230 may generate a decision space (as known in the art and illustrated simplistically in FIG. 2) based on the estimated geolocations, to determine a subset of preferred emitters based on the data projection. In an embodiment where output A2 is used, the preferred emitter list may be viewed as a set of associations where the geolocation is not only spatially close to a known emitter location but also matches in RF characteristics to previous observations of the same vessel. Associations that fit this criteria are very high likely to be emissions from the actual vessel and these high value associations may be referred to as "RF Aware" associations. "RF Aware" associations refers to known emitter associations that use both the geospatial knowledge of where an emitter is physically located and the RF characteristics derived by the GA-USR algorithms.

In establishing the data projection, the geolocation data and the features derived by the expert feature algorithms and machine learning models are projected into a decision space. This decision space may be multi-dimensional and captured as a vector or a linked decision space.

In accordance with the cluster formation process illustrated in FIG. 3, the RFML prediction module 230 may be programmed to identify one or more clusters of geolocations in the decision space, and determine the emitter from the preferred emitter list associated with each cluster. The clustering process may use multiple algorithm outputs linked together to enhance confidence in the assigned preferred emitter identity.

At step 613, in an initialization process, the RFML prediction module 230 may include an untrained RF Signal Recognition (RFSR) model (305 in FIG. 4), which receives as an input the initial labeled dataset 235. After a first pass through the process of steps 600, 610 and 620, an enhanced labeled data set 240 is generated that is used in an iterative process to generate different iterations of the enhanced labeled data set 240 and train the RFSR model 305. In an embodiment, a filter may be applied to the initial labeled data set, using geospatial knowledge and/or outlier detection, to derive a filtered initial labeled dataset. This results in a data set with low label noise (falsely labeled data) and sufficient volume to begin training of the RFML prediction module 230.

To identify emitters that would qualify for the preferred emitter list, a first step is to implement a clustering process in step 614. In the clustering process, as illustrated in FIG. 3, clusters are formed where every geolocation in a cluster (i.e., all geolocations are associated to the same known emitter and have matching RF parameters) are very likely to come from the same emitter. At 614, the RFML prediction module 230 may identify one or more clusters of geolocations based on the decision space and the clustering algorithm selected.

At 615, the RFML prediction module 230 may assemble the identity of emitters according to clusters and form a list of preferred emitters based on the one or more clusters. The output of the preferred emitter list process is provided as an input to the training process 620 for initially training the RFML prediction module 230.

Referring to FIG. 6C for details of the initial RFML training process 620, at 621 the RFML prediction module 230 may generate a training dataset based on the preferred emitter list, for example a list of high quality AIS associations based on multipole RF emissions that were associated to the same MMSI. Using AIS they were determined to be high quality because at least a minimum number, such as 5, AA ad RF associations for one MMSI and the RF characteristics for the associated MMSI appear to be similar. In step 623, the incoming dataset is divided into training batches where samples are a mix of geolocations that are either from the same cluster or from different clusters. This allows the contrastive loss model in step 623 to operate on the batches during training. This training is constructed in two steps. First, a random sampling is taken of batch size, with at least two samples for every class in the batch. Second, geolocations from the preferred emitter list are selected.

For example, the RFML prediction module 230 may generate a training dataset based on associations between individual RF signals of the RF signals 601 and an entity corresponding to one of the preferred list emitters.

At step 622, the RFML prediction module 230 may use the training dataset based on the preferred emitter list to initially train an RFRM 305. During an initialization process, the RFML prediction module 230 may train the RFRM 305 over multiple iterations to generate a trained RFRM 305.

At step 623, the RFML prediction module 230 may determine a loss associated with the RFRM 305 during training, and identify RF characteristics discovered when determining the loss. The RF signal analysis engine 205 may expand the preferred emitter list based on the discovered RF characteristics. For example, the RFML prediction module 230 may filter the projected data to noisy clusters with non-matching RF characteristics, based on the newly discovered RF characteristics.

At 624, the RFML prediction module 230 may back propagate, i.e., feedback, the identified loss to adjust the weights of the RFRM 305. The RFML prediction module 230 may repeat the steps of generating a training batch at step 621, training the RFRM at step 622, performing a loss calculation at step 623, and providing back propagation over multiple iterations at step 624 to minimize the loss of the generated the RFRM 305.

With reference to FIG. 4 and FIG. 6C, this sequence of steps 621, 622, 623 and 624 is an alternative to embodiments using a VAE, as previously explained. In this implementation there are no "feature layers" 325, Instead, the output of feature extractors is combined with the output of the contrastive learning model 623, and passed to clustering algorithms to get a signal recognition output 250.

At step 625, the RFML prediction module 230 receives the output A1 of the subprocess 600 for identifying geolocations with RF metadata and, in an embodiment, may identify geolocations that are geospatially unique, based on the output of the geolocation module 220. Based on a time and location of an RF signal corresponding to each geolocation, and one or more constraints on how quickly a position of the associated emitter may change (e.g., how quickly an emitter may travel), the RFML prediction module 230 may identify batches of geolocations that must be from unique emitters.

At step 626, the RFML prediction module 230 may generate an initial training dataset based on a group of geospatially unique geolocations, where an emitter must be a unique device because it is geospatially impossible to be in the disparate detected locations simultaneously.

At step 627, the RFML prediction module 230 may use the training dataset based on the geospatially unique geolocations to further train the RFRM 305. The training process and model 305 are the same as that used in step 622.

At step 628, the RFML prediction module 230 may determine a loss associated with the RFRM during training, and identify RF characteristics discovered when determining the loss. The RFML prediction module 230 may expand the preferred emitter list based on the discovered RF characteristics.

Use of both the first training path (step 621-step 624) and second training path (step 625-step 624) along with the feedback 629 to the training module 305 via step 624 allows for improved model performance. The output 629 of the feedback step 624 after receiving inputs from contrastive learning steps 623 and 628 in each of the first and second training paths, respectively, is provided as feedback to initially train the model 305. The model 305, once fully trained, along with the preferred emitter list and historical data, may be used identifying emitters through the steady state operation illustrated in FIGS. 7A-7C.

FIGS. 7A-7C illustrate a block diagram of a process for steady state GA-USR, with reference to the system illustrated in FIG. 2, according to an embodiment. The process may be viewed as a sequence of three sub-processes, each respectively illustrated in FIGS. 7A-7C and designated as "Passgroup Processing and Associated Geo Formation" 700, "Preferred Emitter List Formation" 720 and "GA-USR Inference" 730, respectively. As for the initiation process, each passgroup is a snapshot of an emitter output, or geolocations, taken by a satellite constellation at approximately the same time, as illustrated in FIG. 1E. Multiple passgroups of a same emitter are formed over time as the satellite constellation travels in orbit. The first subprocess 700 is directed to passgroup processing and associated geolocation formation, having as an input RF signals and emitter identity information, if available, such as AIS information, a database that tracks fixed emitter sites around the work, or a hand-crafted list of known reference points from an RF analyst, as explained with regard to FIG. 7A. The output is a set of labeled bursts that comprise geolocations with associated RF metadata in a first path 707 and geolocations with associated RF metadata and identity information, if available, in a second path 708. The output of the first path and second path are both output at points designated A in FIG. 7A. This processing, including the use of an known emitter data feed and association processing 716 may be substantially the same as in the "Passgroup Processing and Associated Geo Formation" of FIG. 6A.

The second subprocess 710 called "Preferred Emitter List Formation," which receives the output A2 as an input to a storage 720, is directed to the formation of a "preferred list" of geolocations at its output B. This second subprocess 710, which delivers the storage output to a data projection 721, then a filter outliers, then a filtering process involving clustering 723, and finally a preferred emitter list of geolocations 724, may be substantially the same as the subprocess illustrated in FIG. 6B and described herein. At 724, the RFML prediction module 230 may assemble the identity of emitters according to clusters and form a list of preferred emitters based on the one or more clusters. The output of the preferred emitter list process is provided as an input to the GA-USR Inference process 730 for identification of a candidate geolocation that has been labeled.

In contrast to the initialization flow in FIGS. 6A-6C, there is no third subprocess directed to the initial training of a machine learning model, as a fully trained RF signal recognition data module 230 according to the flow in FIGS. 6A-6C already exists. There would be no training of the RF signal recognition data module 230 during steady state operation. However, a training process as illustrated in FIG. 6C may be used on a quarterly or similar extended periodic basis, where the number of processed geolocations has doubled or the like, or where a predetermined period of time has expired, or the like. In such cases, the processing would include process 6C.

Referring again to FIG. 2 and FIG. 7C, at step 731, the RFML prediction module 230 may receive output A2 of subprocess 700 and calculate the known emitter association using a data projection into a cluster with a corresponding emitter identity. For example, the preferred list may be viewed as a set of associations where the geolocations are spatially close to a known emitter location and also matched in RF characteristics to previous observations of the same emitter, and associations that fit these criteria are very likely to be emissions from the same emitter. These associations are not stored in the projected space and need to be calculated. In order to meet the criteria for preferred list formation, the RFML prediction module 230 also checks that each cluster has only one common emitter association, as errors may occur when there are multiple emitters in small geospatial area. The preferred emitter list at this stage acts like a reference history for each known emitter.

At step 732, the RFML prediction module 230 may implement the decision-making sub-networks 330 of the RFRM using a contrastive learning technique. Here the RFRM runs checks against the trained module such that for each geolocation in the preferred emitter list clusters, the trained model is run to produce a vector in the embedding space. In addition, the preferred emitter list may be expanded further by adding RF characteristics discovered through model training. This will allow better separation of geolocations and improved formation of preferred emitter list clusters.

At step 733, the RFML prediction module 230 may aggregate emitter clusters. For each of these aggregated clusters, a center is calculated in step 734 which is used for similarity comparisons.

At step 735, the RFML prediction module 230 may take the RF signal data and the candidate location data (e.g., output by the geolocation module 220) that is output A from subprocess 710 and provide it as an input to the RFRM. Based on the input, the RFRM may output a predicted emitter identity corresponding to the RF bursts grouped by emitter in the RF signal data. Here new unlabeled geolocation is run through a trained model and generates the embedding of the geolocation which can then be compared to a referenced history.

At 736, the RFML prediction module 230 may determine a similarity to each emitter's center with respect to the center of the aggregated clusters. The comparison is made between the embedding of an unlabeled geolocation to the preferred emitter list center for all emitters in the preferred emitter list. This can be accomplished by a simple dot multiplication and will result in a value. This processing ensures rapid calculation and identification of target emitter in the steady state operation of the system.

At 737, the RFML prediction module 230 may determine if the similarity to each emitter's center satisfies a threshold criteria. In one exemplary process, a score range of +1 to −1, which reflects how well the unlabeled geolocation matches each vessel within the history in the preferred emitter list set, may be used. Using a test set removed from the preferred emitter list during training, a receiver operating characteristic (ROC) curve may be calculated. From the ROC curve, a threshold is selected that has the best rate of True Positive, False Positive based on user input.

At 738, if the threshold criteria is met, the RFML prediction module 230 may use remaining associations as enhanced training data. For example, the RFML prediction module 230 may train a new RFRM 305 in a next iteration based on the enhanced training data. The unlabeled geolocations are newly labeled by the preferred list matches that are above the threshold.

A number of embodiments have been described. Nevertheless, it will be understood that various modifications may be made without departing from the spirit and scope of the invention. For example, various forms of the flows shown above may be used, with steps re-ordered, added, or removed. Accordingly, other embodiments are within the scope of the following claims. While this specification contains many specific implementation details, these should not be construed as limitations on the scope of what may be claimed, but rather as descriptions of features that may be specific to particular embodiments. Certain features that are described in this specification in the context of separate embodiments may also be implemented in combination in a single embodiment.

Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems may generally be integrated together in a single software product or packaged into multiple software products.

Particular embodiments of the subject matter have been described. Other embodiments are within the scope of the following claims. For example, the actions recited in the claims may be performed in a different order and still achieve desirable results. As one example, the processes depicted in the accompanying FIGURES do not necessarily require the particular order shown, or sequential order, to achieve desirable results. In some cases, multitasking and parallel processing may be advantageous.

What is claimed is:

1. A method of training a machine learning (ML) RF signal data model for unique signal recognition and identification of radio frequency (RF) signals, and their emitters, among a plurality of emitted RF signals from a plurality of emitters, comprising:

obtaining the radio frequency (RF) signals emitted by one or more of said emitters;

deinterleaving said RF signals and identifying a plurality of RF bursts from the RF signals, each RF burst corresponding to a repeating RF signal over a short duration;

identifying features of each RF signal; assigning an emitter identification label to each RF group based on a geospatial location and features of each RF burst in the RF group, to generate a labeled dataset representing a geolocation (Geo) with metadata;

storing each said Geo with metadata;

grouping a plurality of Geos into one or more RF groups, each RF group corresponding to a different emitter, based on geospatial information of a plurality of RF receivers that detected the plurality of RF bursts;

processing the plurality of Geos to form a preferred list of Geos with metadata;

in a first training process, generating a first training batch of Geos with metadata from the preferred list and processing the first training batch through the ML model to yield a first ML output;

applying contrastive learning to the first ML output to yield a first contrast loss output;

in a second training process, calculating a geographically unique Geo;

generating a second training batch;

applying the labeled Geos directly to the ML model to yield a second ML output;

applying contrastive learning to the second ML output to yield a second contrast loss output; and applying said first contrast loss output and second contrast loss output to a back propagation process and generate ML training data; and feeding said back said ML training data to said ML model, whereby the ML model is iteratively trained.

2. The method of claim 1, wherein grouping the plurality of RF bursts into the one or more RF groups based on geospatial information of the plurality of RF receivers that detected the plurality of RF bursts comprises:

extracting a set of features from each of the plurality of RF bursts; and determining whether a first RF burst and a second RF burst from the plurality of RF bursts belong to a same RF group, based on the set of features corresponding to the first RF burst and the set of features corresponding to the second RF burst.

3. The method of claim 1, wherein said geospatial location is defined by at least one of latitude, longitude and timing of an RF burst and emitter identification information.

4. The method of claim 1 wherein said grouping of a plurality of Geos into one or more RF groups comprises:

Providing a data projection of said plurality of bursts as connected nodes;

filtering said plurality of bursts to remove weakly connected nodes; and arranging remaining bursts into one or more clusters of connected nodes.

5. The method of claim 4, further comprising: updating the preferred list of labeled Geos based on said clusters.

6. The method of claim 1 wherein said applying contrast to the first ML output comprises: determining a contrastive loss associated with the trained ML model.

7. The method of claim 1 wherein said applying contrast to the second ML output comprises: determining a contrastive loss associated with the trained ML model.

8. The method of claim 1 wherein said steps are repeated a plurality of times, each time for a new RF signal.

9. A method of unique signal recognition for identifying a radio frequency (RF) signal among a plurality of emitted RF signals, comprising:

obtaining a trained machine learning (ML) RF signal data model having a preferred list of candidate emitters, said trained model:

obtaining the radio frequency (RF) signals emitted by one or more of said emitters;

deinterleaving said RF signals and identifying a plurality of RF bursts from the RF signals, each RF burst corresponding to a repeating RF signal over a short duration;

identifying features of each RF signal; assigning an emitter identification label to each RF group based on a geospatial location and features of each RF burst in the RF group, to generate a labeled dataset representing a geolocation (Geo) with metadata;

storing each said Geo with metadata;

grouping a plurality of Geos into one or more RF groups, each RF group corresponding to a different emitter, based on geospatial information of a plurality of RF receivers that detected the plurality of RF bursts;

processing the plurality of Geos to store the plurality of Geos in a preferred list of Geos with metadata;

creating an association of Geos from the preferred list of Geos;

processing the associated Geos through the trained ML model to yield a first ML output;

updating the list of labeled Geos based on the first ML output;

applying contrast to the list to yield a contrast output;

applying the labeled Geos directly to the ML model to yield a second ML output;

comparing the second ML output to the contrast output; and applying a threshold to identify a labeled Geo.

10. The method of claim 9, wherein grouping the plurality of RF bursts into the one or more RF groups based on geospatial information of the plurality of RF receivers that detected the plurality of RF bursts comprises:

extracting a set of features from each of the plurality of RF bursts; and determining whether a first RF burst and a second RF burst from the plurality of RF bursts belong to a same RF group, based on the set of features corresponding to the first RF burst and the set of features corresponding to the second RF burst.

11. The method of claim 10, wherein said geospatial location is defined by at least one of latitude, longitude and timing of an RF burst and emitter identification information.

12. The method of claim 11, wherein said grouping of a plurality of Geos into one or more RF groups comprises:

providing a data projection of said plurality of bursts as connected nodes;

filtering said plurality of bursts to remove weakly connected nodes; and arranging remaining bursts into one or more clusters of connected nodes.

13. The method of claim 12, further comprising: updating the preferred list of labeled Geos based on said clusters.

14. The method of claim 9, wherein said step of creating an association of Geos further comprises applying contrast to the Geo preferred list.

15. The method of claim 9, wherein said processing of associated Geos through the trained ML model is a first ML processing that is followed by a step of aggregating contrast clusters by normalized arithmetic mean across each vector dimension to yield an embedding center.

16. The method of claim 9 wherein said step of applying labeled Geos directly to the ML model further comprises processing the labeled Geos through the trained ML model to determine a center.

17. The method of claim 9 wherein the comparison of the second ML output to the contrast output is made by dot multiplication.

18. A computing device for initializing an artificial intelligence (AI) based process for identifying a unique signal, comprising:

a deinterleaving module configured to group time-adjacent radio frequency (RF) bursts and extract features from geolocations (Geos) in the group;

a geolocation module configured to map the time-adjacent RF bursts in the group to a geolocation;

an assignation module configured to identify an RF emitter corresponding to the group with an emitter identifier;

a memory storing one or more instructions and historical data;

a processor configured to execute the one or more instructions to iteratively:

storing each Geo with metadata;

grouping a plurality of Geos into one or more RF groups, each RF group corresponding to a different emitter, based on geospatial information of a plurality of RF receivers that detected the plurality of RF bursts;

processing plurality of Geos to form a preferred list of Geos with metadata;

in a first training process, generating a first training batch of Geos with metadata from the preferred list through the ML model to yield a first ML output;

updating a preferred list of labeled Geos based on the first ML output;

applying contrast to the first ML output to yield a first contrast loss output;

in a second training process, calculating a geographically unique Geo;

generating a second training batch;

applying the labeled Geos directly to the ML model to yield a second ML output;

applying contrast to the second ML output to yield a second contrast loss output; and applying said first contrast loss output and second contrast loss output to a back propagation process and generate ML training data; and feeding said back said ML training data to said ML model, whereby the ML model is iteratively trained.

19. The computing device of claim 18, further comprising a source of Automated Information System (AIS) information.

20. A computing device for identifying a unique signal in a steady state process, comprising:

a deinterleaving module configured to group time-adjacent radio frequency (RF) bursts and extract features from geolocations (Geos) in the group;

a geolocation module configured to map the time-adjacent RF bursts in the group to a geolocation;

an assignation module configured to identify an RF emitter corresponding to the group with an emitter identifier;

a memory storing one or more instructions and historical data;

a processor configured to execute the one or more instructions to iteratively:

storing each Geo with metadata;

grouping a plurality of Geos into one or more RF groups, each RF group corresponding to a different emitter, based on geospatial information of a plurality of RF receivers that detected the plurality of RF bursts;

processing the plurality of Geos to store the plurality of Geos in a preferred list of Geos with metadata;

creating an association of Geos from the preferred list;

processing the associated Geos through a trained machine learning (ML) model to yield a first ML output;

updating the list of labeled Geos based on the first ML output;

applying contrast to the preferred list to yield a contrast output;

applying the labeled Geos directly to the ML model to yield a second ML output;

comparing the second ML output to the contrast output; and applying a threshold to identify a labeled Geo.

21. The computing device of claim 20, further comprising a source of Automated Information System (AIS) information.

* * * * *